(12) United States Patent  
Teterwak

(10) Patent No.: US 9,014,299 B2  
(45) Date of Patent: Apr. 21, 2015

(54) DIGITAL PRE-DISTORTION SYSTEM FOR RADIO FREQUENCY TRANSMITTERS WITH REDUCED SAMPLING RATE IN OBSERVATION LOOP

(71) Applicant: Maxim Integrated Products, Inc., San Jose, CA (US)

(72) Inventor: Jerzy Antoni Teterwak, Colorado Springs, CO (US)

(73) Assignee: Maxim Integrated Products, Inc., San Jose, CA (US)

(*) Notice: Subject to any disclaimer, the term of this patent is extended or adjusted under 35 U.S.C. 154(b) by 10 days.

(21) Appl. No.: 13/932,099

(22) Filed: Jul. 1, 2013

(65) Prior Publication Data

US 2014/0161207 A1   Jun. 12, 2014

Related U.S. Application Data

(60) Provisional application No. 61/734,602, filed on Dec. 7, 2012.

(51) Int. Cl.
*H04K 1/02* (2006.01)
*H04L 1/00* (2006.01)
*H04L 27/36* (2006.01)

(52) U.S. Cl.
CPC ............ *H04L 1/0033* (2013.01); *H04L 27/368* (2013.01)

(58) Field of Classification Search
USPC .................................. 375/297; 330/149, 151
See application file for complete search history.

(56) References Cited

U.S. PATENT DOCUMENTS

| | | | | |
|---|---|---|---|---|
| 6,078,216 | A * | 6/2000 | Proctor, Jr. | 330/151 |
| 2003/0156658 | A1 * | 8/2003 | Dartois | 375/297 |
| 2013/0120062 | A1 * | 5/2013 | Lozhkin | 330/149 |

* cited by examiner

*Primary Examiner* — Daniel Washburn  
*Assistant Examiner* — Fitwi Hailegiorgis

(57) ABSTRACT

A system includes a digital to analog converter, a power amplifier, an analog-to-digital converter, a filter, and a pre-distortion module. The digital to analog converter generates analog data based on digital data. The power amplifier generates output data based on the analog data. The analog-to-digital converter generates samples based on the output data at a sampling rate less than a Nyquist sampling rate. The filter filters the digital data and generates filtered data. The pre-distortion module distorts the digital data based on the samples and the filtered data to compensate for distortion generated by the power amplifier.

12 Claims, 20 Drawing Sheets

DIGITAL PRE-DISTORTION SYSTEM FOR RADIO FREQUENCY TRANSMITTERS WITH REDUCED SAMPLING RATE IN OBSERVATION LOOP

CROSS-REFERENCE TO RELATED APPLICATIONS

This application claims the benefit of U.S. Provisional Application No. 61/734,602 filed on Dec. 7, 2012. The entire disclosure of the application referenced above is incorporated herein by reference.

FIELD

The present disclosure relates generally to communication systems and more specifically to a digital pre-distortion system for radio frequency transmitters with reduced sampling rate in observation loop.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Digital Pre-Distortion (DPD) systems are used in Radio Frequency (RF) transmitters to cancel distortions in a power amplifier (PA) stage. The DPD typically uses an Analog-to-Digital Converter (ADC) in an observation loop. In DPD systems, the ADC conversion rate has to follow Nyquist sampling requirements for the bandwidth of the transmit signal multiplied by the order of the DPD. In modern communication systems, the ADC in the observation loop may have to capture up to 1 GHz of bandwidth. This requirement pushes the limits of current technology and increases the cost of the DPD systems.

SUMMARY

A system comprises a digital to analog converter, a power amplifier, an analog-to-digital converter, a filter, and a pre-distortion module. The digital to analog converter generates analog data based on digital data. The power amplifier generates output data based on the analog data. The analog-to-digital converter generates samples based on the output data at a sampling rate less than a Nyquist sampling rate. The filter filters the digital data and generates filtered data. The pre-distortion module distorts the digital data based on the samples and the filtered data to compensate for distortion generated by the power amplifier.

In other features, the system further comprises an adaptation module that includes a distortion model of the power amplifier that is used to generate weights based on the samples and the filtered data. The pre-distortion module distorts the digital data based on the weights.

In other features, the system further comprises an adaptation module that includes a distortion model of the power amplifier that is used to distort the filtered data to generate distortion components and a correlator that correlates the distortion components with nonlinear components of an error signal generated based on the samples and the filtered data and that generates weights. The pre-distortion module distorts the digital data based on the weights.

In other features, the system further comprises a downsampling module that downsamples the filtered data and that generates downsampled data that are time-aligned with the samples generated by the analog-to-digital converter, a subtractor that generates an error signal based on the samples and the downsampled data, a distortion model of the power amplifier that is used to distort the filtered data to generate distortion components, and a correlator that correlates the distortion components with nonlinear components of the error signal and that generates weights. The pre-distortion module distorts the digital data based on the weights.

In other features, the system further comprises a downsampling module that downsamples the filtered data by a factor k and that generates downsampled data that are time-aligned with the samples generated by the analog-to-digital converter and a subtractor that generates an error signal based on the samples and the downsampled data. The filter includes a finite impulse response filter having coefficients that are adjusted based on the error signal at every k-th sample generated by the analog-to-digital converter.

In still other features, a system comprises a power amplifier that generates output data based on digital data, an analog-to-digital converter that generates samples based on the output data at a sampling rate less than a Nyquist sampling rate, a filter that filters the digital data and that generates filtered data, a distortion model of the power amplifier that is used to distort the filtered data to generate distortion components, a correlator that correlates the distortion components with nonlinear components of an error signal generated based on the samples and the filtered data and that generates weights, and a pre-distortion module that distorts the digital data based on the weights to compensate for distortion generated by the power amplifier.

In other features, the system further comprises a downsampling module that downsamples the filtered data and that generates downsampled data that are time-aligned with the samples generated by the analog-to-digital converter and a subtractor that generates the error signal based on the samples and the downsampled data.

In other features, the system further comprises a downsampling module that downsamples the filtered data by a factor k and that generates downsampled data that are time-aligned with the samples generated by the analog-to-digital converter and a subtractor that generates the error signal based on the samples and the downsampled data. The filter includes a finite impulse response filter having coefficients that are adjusted based on the error signal at every k-th sample generated by the analog-to-digital converter.

In still other features, a method comprises generating analog data based on digital data, generating output data based on the analog data using a power amplifier, generating samples based on the output data at a sampling rate less than a Nyquist sampling rate, filtering the digital data to generate filtered data, and distorting the digital data based on the samples and the filtered data to compensate for distortion generated by the power amplifier.

In other features, the method further comprises generating weights based on the samples and the filtered data using a distortion model of the power amplifier and distorting the digital data based on the weights.

In other features, the method further comprises distorting the filtered data using a distortion model of the power amplifier to generate distortion components, correlating the distortion components with nonlinear components of an error signal generated based on the samples and the filtered data to generate weights, and distorting the digital data based on the weights.

In other features, the method further comprises downsampling the filtered data and generating downsampled data that are time-aligned with the samples, generating an error signal based on the samples and the downsampled data, distorting the filtered data using a distortion model of the power amplifier to generate distortion components, correlating the distortion components with nonlinear components of the error signal to generate weights, and distorting the digital data based on the weights.

In other features, the method further comprises downsampling the filtered data by a factor k and generating downsampled data that are time-aligned with the samples, generating an error signal based on the samples and the downsampled data, and adjusting coefficients for the filtering based on the error signal at every k-th sample.

In still other features, a method comprises generating output data based on digital data using a power amplifier, generating samples based on the output data at a sampling rate less than a Nyquist sampling rate, filtering the digital data to generate filtered data, distorting the filtered data using a distortion model of the power amplifier to generate distortion components, correlating the distortion components with nonlinear components of an error signal generated based on the samples and the filtered data to generate weights, and distorting the digital data based on the weights to compensate for distortion generated by the power amplifier.

In other features, the method further comprises downsampling the filtered data to generate downsampled data that are time-aligned with the samples, and generating the error signal based on the samples and the downsampled data.

In other features, the method further comprises downsampling the filtered data by a factor k to generate downsampled data that are time-aligned with the samples, generating the error signal based on the samples and the downsampled data, and adjusting coefficients for the filtering based on the error signal at every k-th sample.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
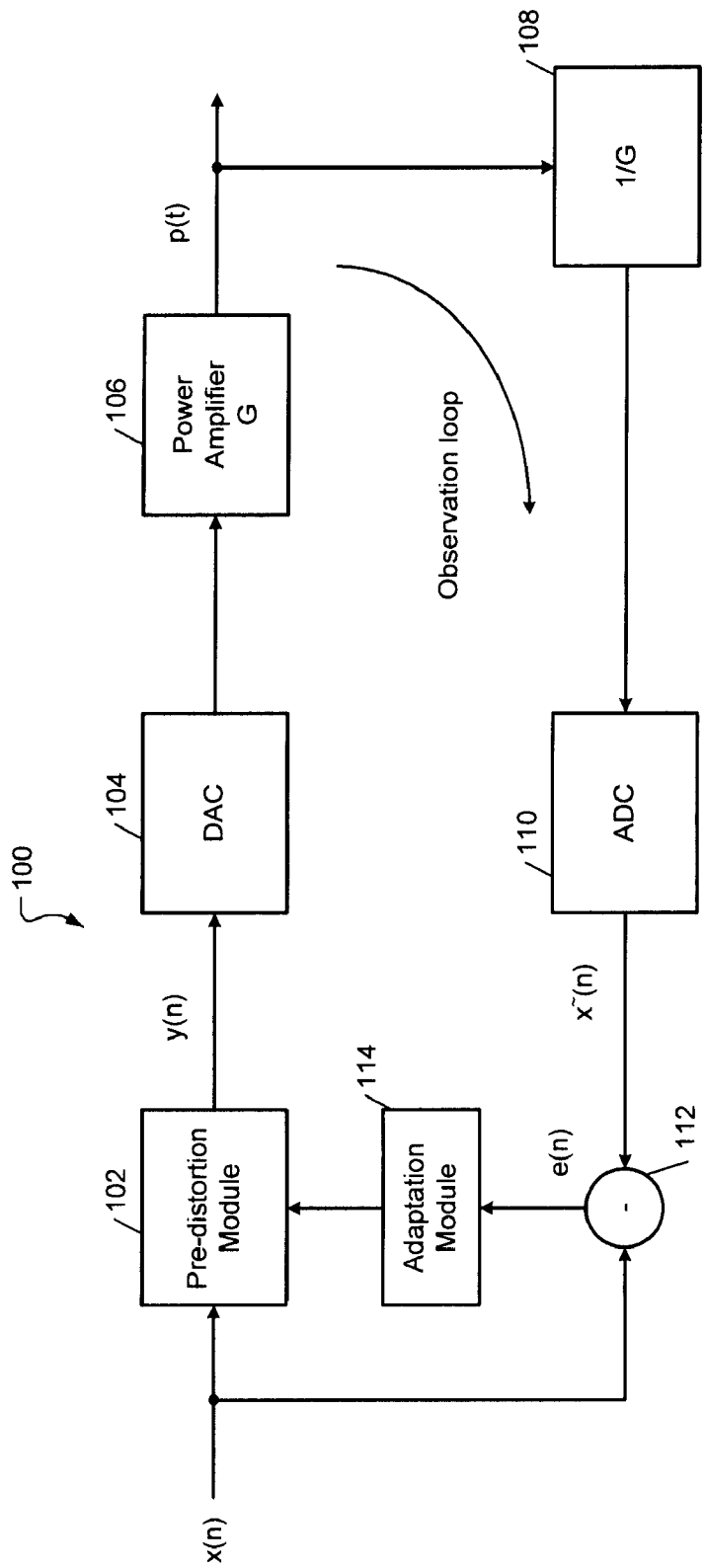
FIG. 1 is a functional block diagram of a transmitter including a direct-learning digital pre-distortion (DPD) system operating in a radio frequency (RF) domain.

Referring now to FIG. 1, an RF transmitter 100 includes a pre-distortion module 102, a digital-to-analog converter (DAC) 104, a power amplifier 106, a feedback module 108, an ADC 110, a subtractor 112, and an adaptation module 114. Digital data to be transmitted, x(n), is input to the pre-distortion module 102. The pre-distortion module 102 outputs data y(n) to the DAC 104. The pre-distortion module 102 distorts the data to be transmitted, x(n), and generates distorted data y(n). The DAC 104 converts the distorted data y(n) from digital to analog format. The power amplifier 106 amplifies the analog data output by the DAC 104 with a gain G. The power amplifier 106 outputs amplified data p(t). The transmitter 100 transmits the amplified data p(t).

The feedback module 108 scales the amplified data p(t) output by the power amplifier 106 with a gain of 1/G. The feedback module 108 outputs a scaled version of the data to be transmitted. The feedback module 108 outputs the scaled data to the ADC 110. The ADC 110 converts the scaled data from analog to digital format. The ADC 110 outputs digital data x(n). The subtractor 112 subtracts the digital data x(n) from the digital data x(n) input to the pre-distortion module 102. The subtractor 112 generates an error signal e(n). The adaptation module 114 controls the pre-distortion module 102 based on the error signal e(n).

The Digital Pre-Distortion (DPD) technique is used in RF transmitters to cancel nonlinear distortion generated in the power amplifier 106 (PA distortion). The adaptation module 114 adjusts parameters of the pre-distortion module 102 such that the error signal e(n) is minimized. When the error signal e(n) becomes equal to zero, the pre-distortion module 102 generates distortion that cancels the PA distortion.

To meet Nyquist requirements, the ADC 110 in the observation loop has to operate at a conversion rate greater than twice the bandwidth of the transmit signal multiplied by an order of the pre-distortion module 102. In emerging standards, the ADC conversion rate may have to reach 2 GHz. Specifically, the ADC 110 in the observation loop may have to capture up to 1 GHz of bandwidth. Accordingly, the ADC 110 may have to operate at conversion rates greater than 2 GHz.

Operating at conversion rates greater than 2 GHz pushes the limits of the current technology and increases the cost of the DPD system.

The present disclosure relates to reducing the sampling rate of the ADC in the observation loop in Digital Pre-Distortion (DPD) systems used in RF transmitters. Reducing the sampling rate of the ADC reduces the power consumption and cost of DPD systems. The present disclosure introduces a DPD architecture, where the sampling rate in the observation loop can be arbitrarily low and is determined only by the adaptation convergence time requirements.

The present disclosure applies to the DPD system used in Radio Frequency (RF) transmitters. In particular, the present disclosure is applicable to transmitters used in cellular Base Transceiver Stations (BTS) and in other communication systems. The power amplifiers (PAs) used in the RF transmitters are nonlinear devices. The nonlinearities of the power amplifiers cause both distortion of the transmit signal and increased out-of-band power leakage, which leads to a rise in adjacent channel interference. The overall power efficiency and fulfilling system requirements (e.g., error vector magnitude (EVM) and spectral mask) are mainly determined by the nonlinear behavior of the power amplifier. Therefore, some linearization techniques are essential to minimize the distortion of the transmit signal without compromising the efficiency of the power amplifier.

Digital pre-distortion is most effective among the linearization techniques used. In the DPD, the transmit signal is intentionally distorted in such a way that the introduced distortion cancels the distortion generated by the power amplifier. The pre-distortion is introduced in the digital domain prior to inputting the transmit data to the power amplifier. The transmit signal is pre-distorted based on a nonlinear PA model. The model parameters are optimized for best distortion cancellation.

PA model parameters are optimized using an adaptation algorithm. For example, a direct learning adaptation system is shown in FIG. 1. In the direct learning adaptation system, the output signal of the power amplifier is converted using an ADC back into the digital domain and compared with the undistorted signal. The distortion model parameters are then optimized such that the difference between the undistorted signal and the measured output signal is minimized.

Figure 2:
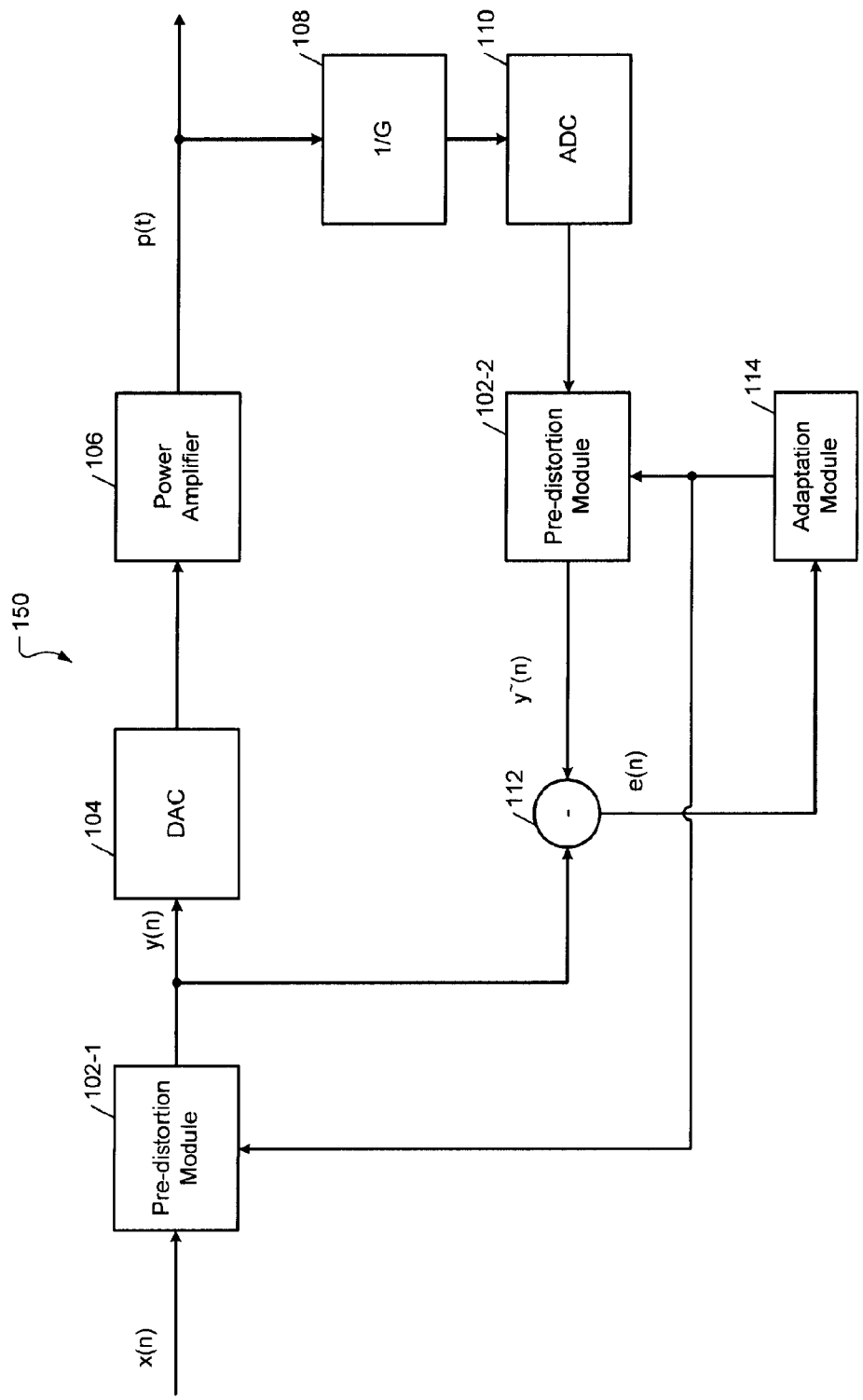
FIG. 2 is a functional block diagram of a transmitter including an indirect-learning DPD system operating in the radio frequency RF domain.

Referring now to FIG. 2, an indirect learning adaptation system is shown. The indirect learning adaptation system is more robust and less sensitive to distortion model inaccuracies than the direct learning adaptation system. In both cases, the adaptation process uses Least Mean Square (LMS) or Recursive Least Square (RLS) algorithm.

In FIG. 2, an RF transmitter 150 includes a first pre-distortion module 102-1, the digital-to-analog converter (DAC) 104, the power amplifier 106, the feedback module 108, the ADC 110, a second pre-distortion module 102-2, the subtractor 112, and the adaptation module 114. The first pre-distortion module 102-1 may be similar to the second pre-distortion module 102-2. That is, the first and second pre-distortion modules 102-1 and 102-2 use identical nonlinear PA models and model parameters.

Digital data to be transmitted, x(n), is input to the first pre-distortion module 102-1. The first pre-distortion module 102-1 distorts the data to be transmitted, x(n), and outputs distorted data y(n) to the DAC 104. The DAC 104 converts the distorted data y(n) from digital to analog format. The power amplifier 106 amplifies the analog data output by the DAC 104 with a gain G. The power amplifier 106 outputs amplified data p(t). The transmitter 150 transmits the amplified data p(t).

The feedback module 108 scales the amplified data p(t) output by the power amplifier 106 with a gain of 1/G. The feedback module 108 outputs a scaled version of the data to be transmitted. The feedback module 108 outputs the scaled data to the ADC 110. The ADC 110 converts the scaled data from analog to digital format. The ADC 110 outputs digital data. The second pre-distortion module 102-2 distorts the digital data output by the ADC 110 and generates distorted data y(n). The subtractor 112 subtracts the distorted data y(n) from the distorted data y(n). The subtractor 112 generates an error signal e(n). The adaptation module 114 controls the first and second pre-distortion modules 102-1 and 102-2 based on the error signal e(n).

The Digital Pre-Distortion (DPD) technique is used to cancel nonlinear distortion generated in the power amplifier 106 (PA distortion). The adaptation module 114 adjusts parameters of the second pre-distortion module 102-2 such that the error signal e(n) is minimized. When the error signal e(n) becomes equal to zero, the second pre-distortion module 102-2 generates distortion that cancels the PA distortion. The first pre-distortion module 102-1 uses identical model and parameters as the second pre-distortion module 102-2 to distort the transmit signal to further enhance cancellation of the distortion generated by the power amplifier 106.

In FIGS. 1 and 2, both the Digital-to-Analog Converter (DAC) 104 and the Analog-to-Digital Converter (ADC) 110 operate in the RF signal path. The requirement that the converter sampling rates have to meet Nyquist criterion imposes unacceptable requirements on the converter speed. The converter sampling rate may be lowered by moving the DPD operation to baseband frequency domain.

Figure 3:
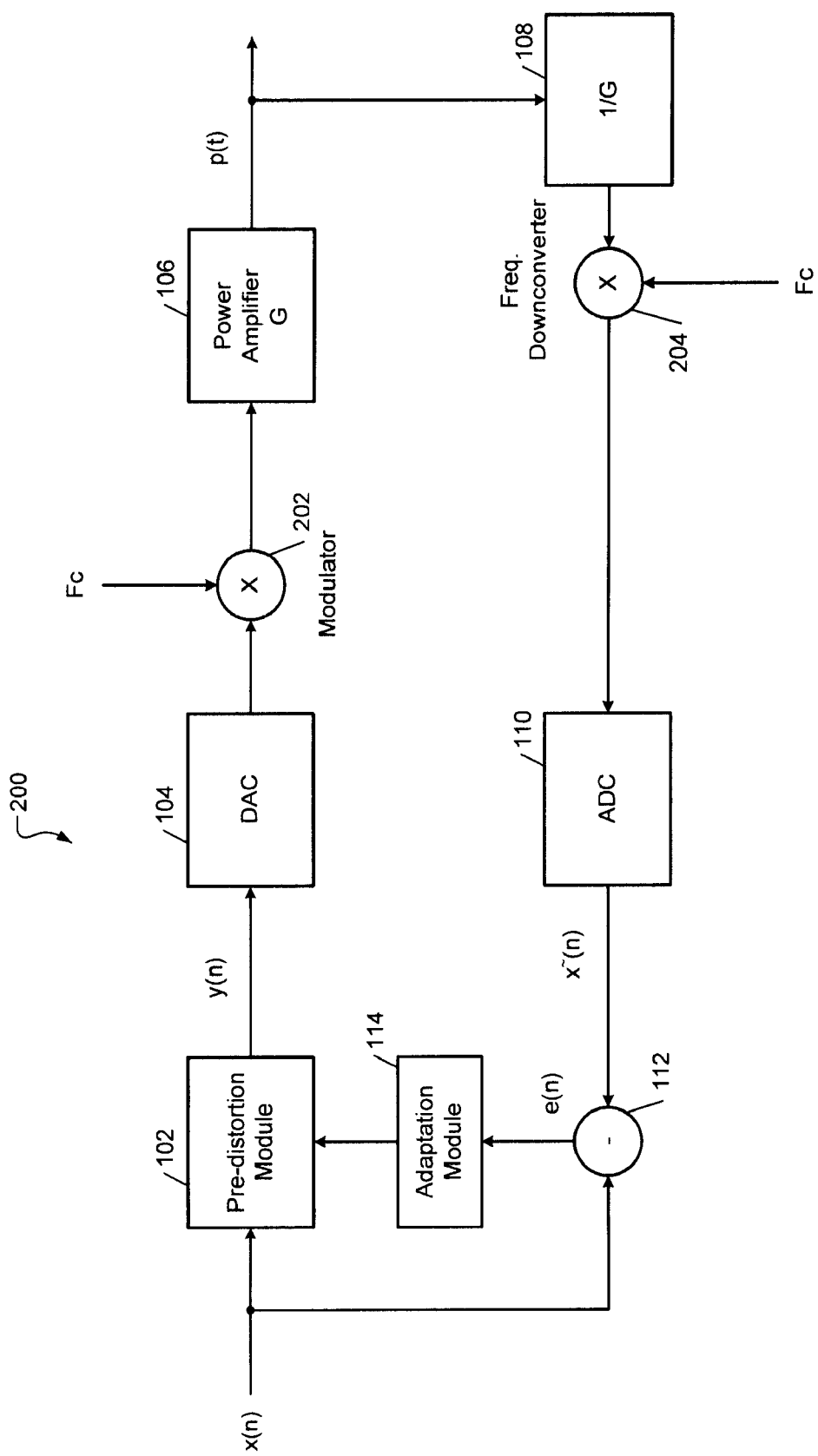
FIG. 3 is a functional block diagram of a transmitter including a direct-learning DPD system operating in a baseband frequency domain.
Figure 4:
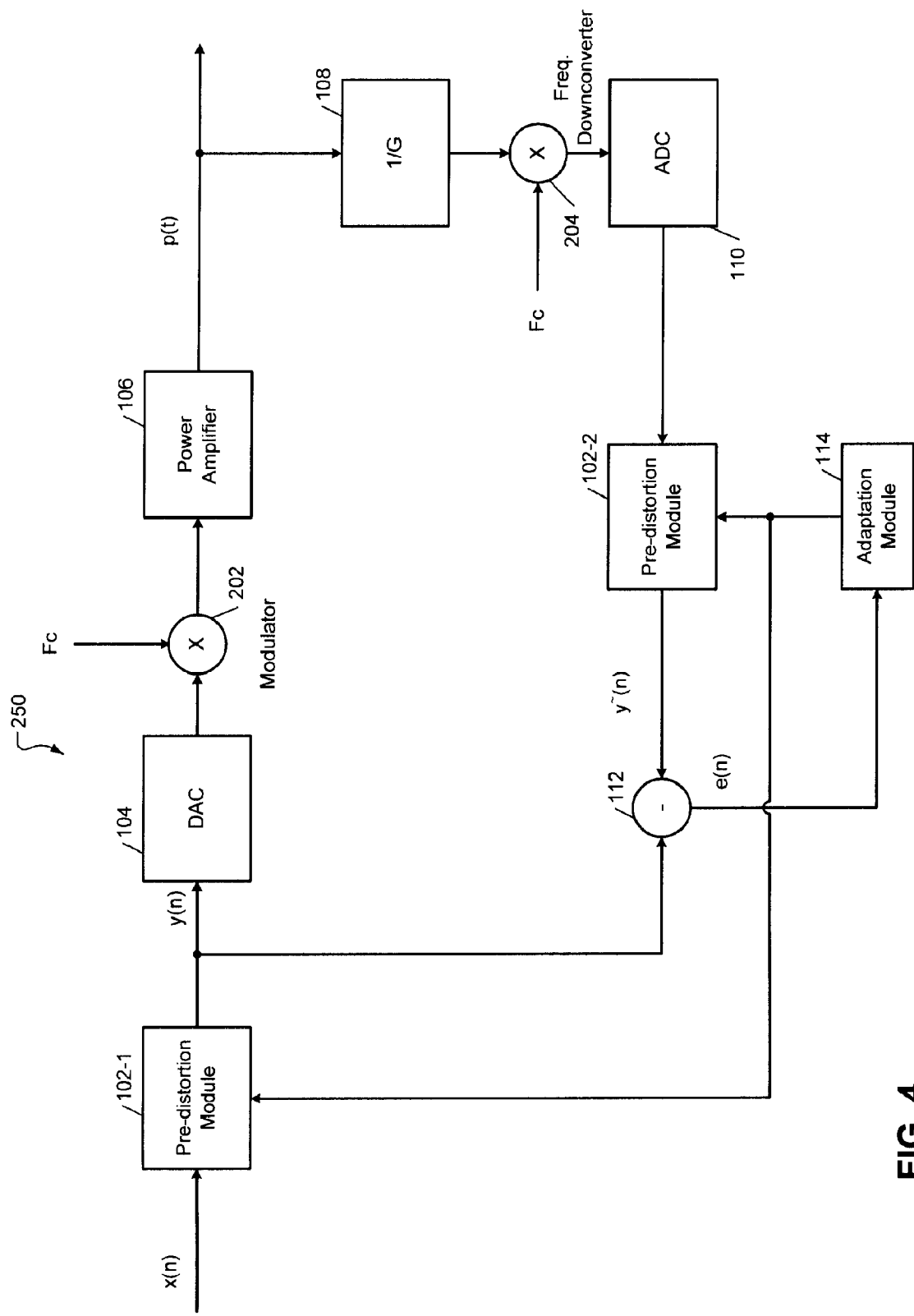
FIG. 4 is a functional block diagram of a transmitter including an indirect-learning DPD system operating in the baseband frequency domain.

Referring now to FIGS. 3 and 4, transmitters using DPD systems in baseband frequency domain are shown. FIG. 3 shows a transmitter 200 comprising a direct learning DPD system in the baseband frequency domain. FIG. 4 shows a transmitter 250 comprising an indirect learning DPD system in the baseband frequency domain.

In FIG. 3, the transmitter 200 includes all the components of the transmitter 100 shown in FIG. 1 and additionally includes a modulator 202 and a frequency downconverter 204. In FIG. 4, the transmitter 250 includes all the components of the transmitter 150 shown in FIG. 2 and additionally includes the modulator 202 and the frequency downconverter 204.

In FIGS. 3 and 4, the modulator 202 modulates the output of the DAC 104. The output of the modulator 202 is input to the power amplifier 106. In the observation loop, the frequency downconverter 204 downconverts the output of the feedback module 108 from RF to baseband frequency domain. The pre-distortion module 102 and the adaptation module 114 operate in the baseband frequency domain. The sampling rates of the DAC 104 and the ADC 110 can be lowered by moving the DPD operation to baseband frequency domain.

In the DPD systems, the ADC conversion rate has to fulfill the requirements of the Nyquist sampling theorem. Accordingly, the ADC has to operate at a sampling rate greater than twice the bandwidth of the input signal. Because of this requirement, if the DPD is performed at baseband frequency, the ADC has to operate at a sampling rate greater than twice the bandwidth of the signal at the PA output. (Alternatively, two ADCs for I and Q signal components can operate at half the sampling rate).

The signal at the PA output includes intermodulation components resulting from PA nonlinearity. Accordingly, the overall signal bandwidth, which has to be captured by the ADC, is N times wider than the transmitter bandwidth, where N is the order of the PA distortion to be corrected by the DPD. In modern BTS transmitters, the transmit bandwidth can be as wide as 200 MHz with required fifth order pre-distortion. This results in 1 GHz DPD bandwidth, which has to be captured by the ADC. Such a requirement for the ADC performance pushes the limits of the current technology and increases the cost of the transmitters.

The present disclosure proposes that the Nyquist requirement need not be followed in sampling the error signal e(n). Specifically, since driving the error signal e(n) to zero is equivalent to driving power of the error signal e(n) to zero, measuring the power of the error signal e(n) is sufficient. The transmit signal and the error signal can be approximated by band-limited noise with autocorrelation function approaching zero with increasing time. Accordingly, the power of the error signal e(n) can be estimated by collecting a sufficient number of samples, and the sampling rate is irrelevant.

In the new proposed DPD architecture, the ADC conversion rate can be arbitrarily low, and the lower conversion rate of the ADC will affect only the convergence time of the adaptation module. The new DPD solution is based on the observation that the least square adaptation algorithms work based on minimization of the error signal power and that the power of a random signal can be measured with arbitrarily low sampling rate. The transmit signal in digital communication systems can be considered random and so can be the error signal supplied to the adaptation module.

Figure 5:
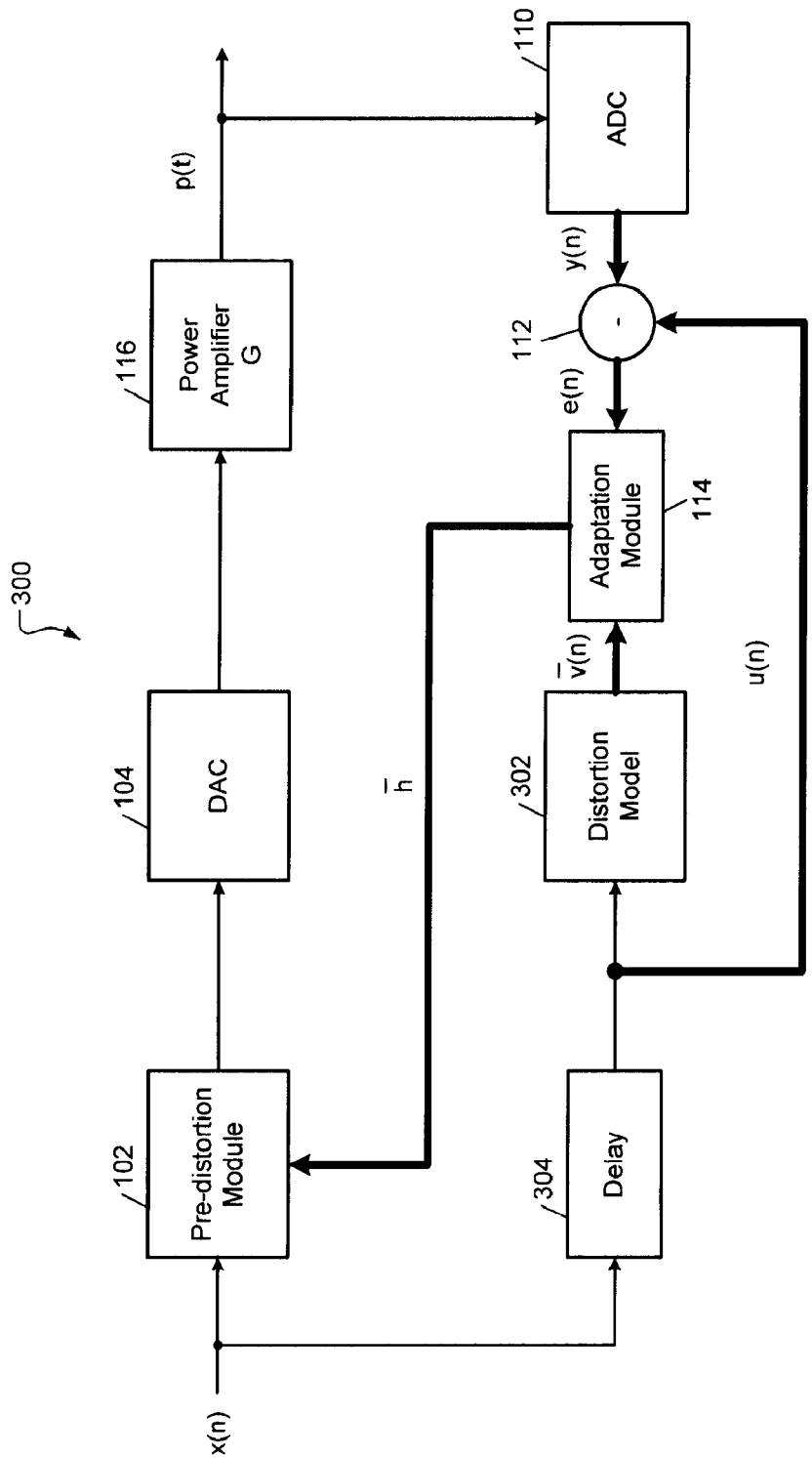
FIG. 5 is a functional block diagram of a transmitter including a DPD system operating at a lower than Nyquist sampling rate.

Referring now to FIG. 5, a transmitter 300 comprises an ADC having an arbitrarily low conversion rate. The transmitter 300 includes the pre-distortion module 102, the DAC 104, and the power amplifier 106. The ADC 110 converts the output of the power amplifier 106, p(t), from analog to digital format and outputs data y(n). The transmitter includes a delay module 304 that delays the data to be transmitted, x(n), and outputs the delayed transmit data to a distortion model 302. The distortion model 302 generates a vector $\bar{v}(n)$ as explained below and outputs the vector to the adaptation module 114. The subtractor 112 generates the error signal e(n) based on a difference between the data y(n) output by the ADC 110 and the delayed transmit data output by the delay module 304. The adaptation module 114 controls the pre-distortion module 102 based on the error signal e(n) and the vector V (n) as explained below.

In FIG. 5, the signal sampled at low rate does not pass through any linear or nonlinear dynamic block with memory and therefore its time information is irrelevant. This enables the reduction of the sampling rate in the DPD observation loop.

In FIG. 5, the ideal input signal x(n) is split into two paths. The main path goes through the pre-distortion module 102, the DAC 104, and the power amplifier 106. The secondary path is used to generate a vector of expected distortion components. After passing through the delay module 304, the ideal signal x(n) enters the distortion model 302. The distortion model 302 generates all signal components used in Volterra series expansion and outputs them as vectors $\bar{v}(n)$ (shown as vector do in FIG. 16).

Vector v(n) can be defined as follows. Let vectors $\bar{u}_{(m_1,m_2,\ldots)}$ be unit basis vectors of $\bar{v}(n)$. $\bar{v}(n)$ can be written as $$\bar{v}(n) = \sum_{m_1=0}^{M-1} \sum_{m_2=m_1}^{M-1} \bar{u}_{(m_1,m_2)} x(n-m_1)x(n-m_2) +$$
(Eq. 1)

-continued
$$\ldots \sum_{m_1=0}^{M-1} \sum_{m_2=m_1}^{M-1} \ldots \sum_{m_p=m_{p-1}}^{M-1} \bar{u}_{(m_1,m_2,\ldots,m_p)}$$

$$x(n-m_1)x(n-m_2) \ldots x(n-m_p)$$

In Equation (1), vector $\bar{v}(n)$ contains all signal components of p-th order Volterra series expansion with memory of M samples. In practical applications, Volterra series expansion is truncated and pruned to obtain sufficient accuracy of distortion modeling with minimal number of terms.

Volterra series expansion of signal x(n) is a linear combination of the components of vector $\bar{v}(n)$. Accordingly, the distortion signal e(n) can be estimated as follows.

$$\tilde{e}(n) = \bar{v}(n) \cdot \bar{h}^T$$
(Eq. 2)

In FIG. 5, the adaptation module 114 finds such a vector $\bar{h}$ that the error signal e(t) is best estimated by Equation (2). In subsequent adaptation steps, the power of error signal e(t) is minimized by updating $\bar{h}$ based of the residual error signal.

The error signal is cancelled by subtracting weighted distortion components from the input signal x(n) in the pre-distortion module 102. The pre-distortion module 102 contains a copy of the distortion model 302. The pre-distortion module 102 calculates the error signal estimate based on Equation (2) and vector $\bar{h}$ from the adaptation module 114. The computed error signal estimate is subtracted from the input signal x(n).

The adaptation uses some variant of either LMS or RLS algorithm to determine vector $\bar{h}$. In either case, the samples of the error signal e(n) can be delivered to the adaptation module 114 at an arbitrarily low rate determined only by the adaptation convergence time requirements.

In FIG. 5, the reduced sampling rate signal paths are marked with bold line. In practice, the sampling rate in the slow sampling path will be equal to an integer fraction of the input signal x(n) sampling rate.

The DPD architecture described above assumes that the transmit signal is a random stationary process. In practice, the transmit signal is pseudo-random and may have cyclostationary characteristics. Accordingly, the slow sampling rate has to be selected such that it is asynchronous with the cycle of the transmit signal.

The random characteristics of the error signal e(n) can be further improved by randomizing the sampling rate in the DPD observation loop. Specifically, the samples in the observation loop are taken every N samples of the input signal x(n), and N is randomly varied in some range.

In FIG. 5, a fixed delay provided by the delay module 304 is used to align in time the desired input signal x(n) with measured output signal y(n). In practice, however, the latency and frequency response of the observation loop is not known. Moreover, the latency and frequency response of the observation loop will vary due to operating condition variation. Therefore, the delay module 304 should be replaced by a more general filter with ability to adapt and track the changing linear characteristics of the observation loop.

Figure 6:
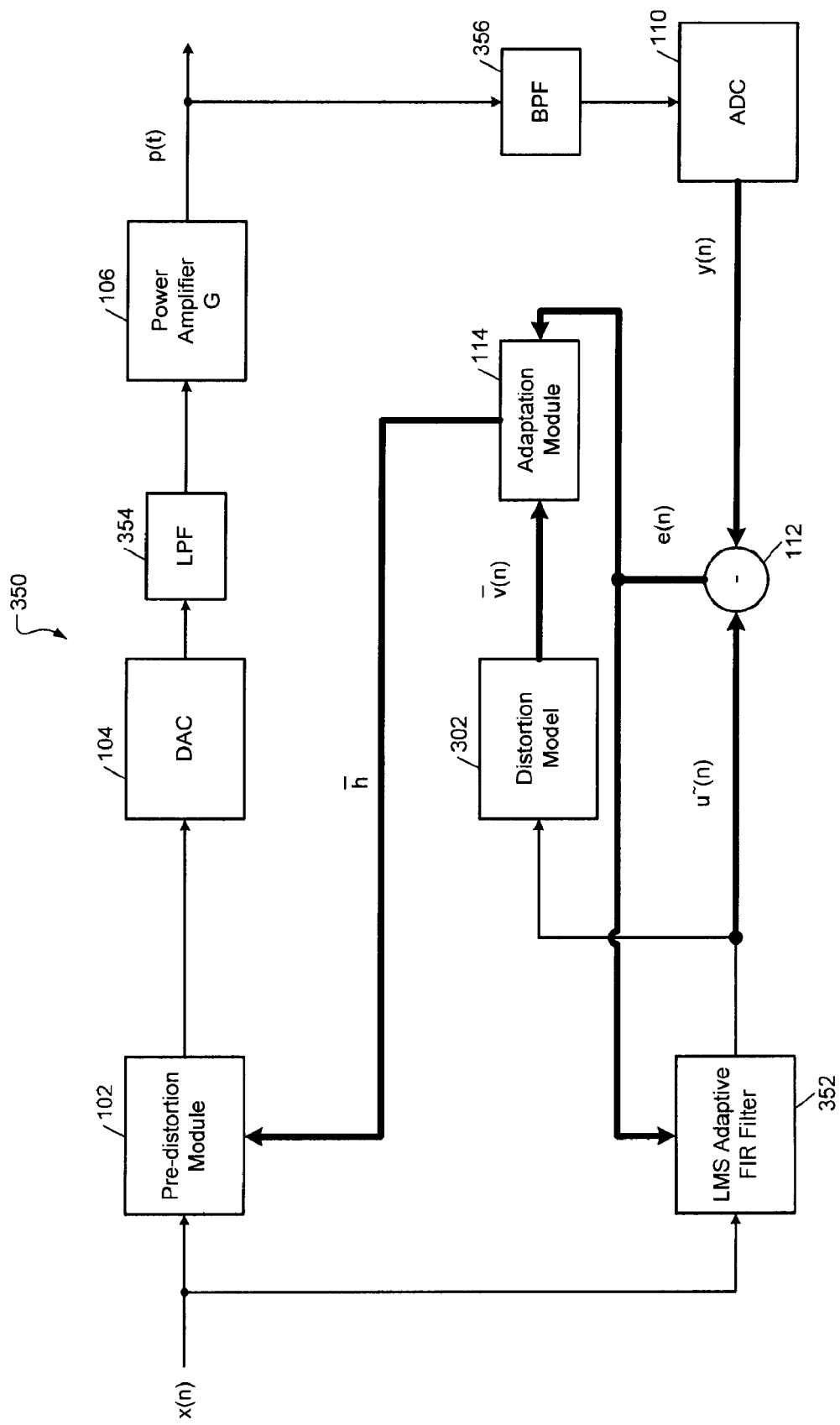
FIG. 6 is a functional block diagram of a transmitter including a DPD system operating at a lower than Nyquist sampling rate and with observation loop frequency response compensation.
Figure 7:
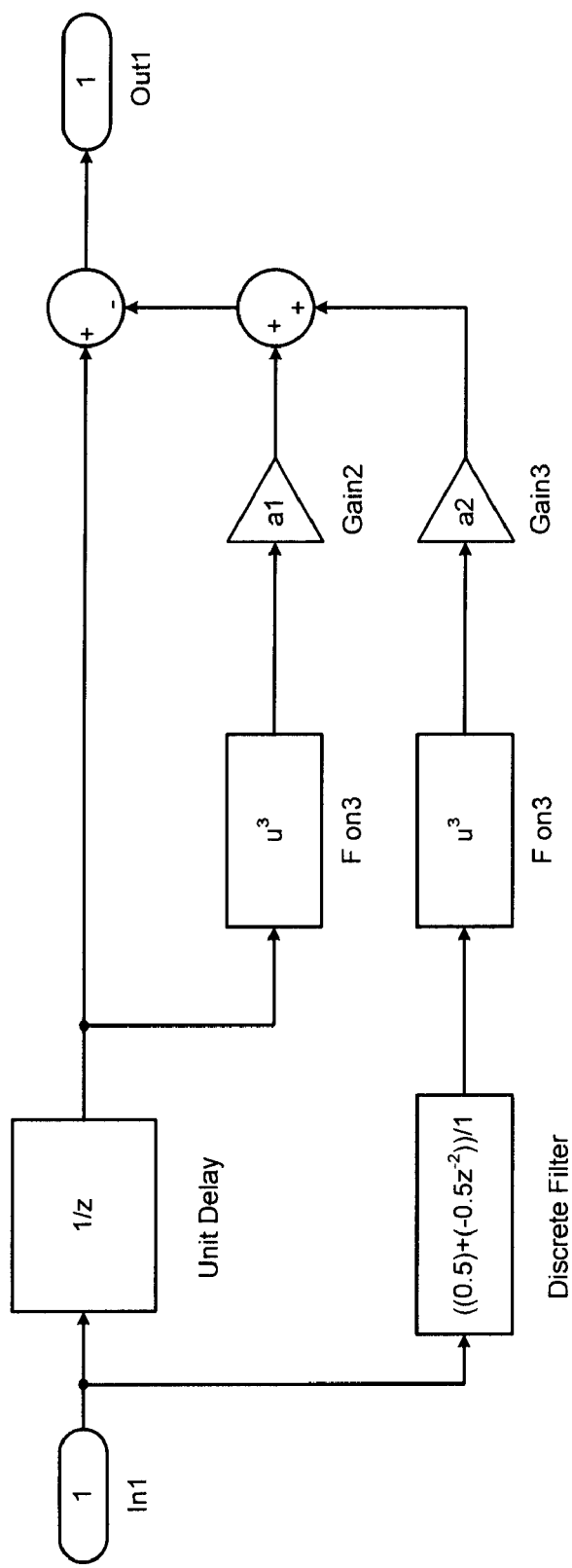
FIG. 7 is an example of a pre-distortion model used in simulation.

Referring now to FIG. 6, a transmitter 350 comprising an improved DPD loop is shown. Unlike the transmitter 300 shown in FIG. 5, the transmitter 350 does not include the delay module 304. Instead, the transmitter 350 includes an adaptive FIR filter (e.g., LMS adaptive FIR filter) 352. Additionally, the transmitter 350 includes a low-pass filter 354 and a band-pass filter 356. The low-pass filter 354 filters the output of the DAC 104 and outputs the filtered output to the power amplifier 106. The band-pass filter 356 filters the output of the power amplifier 106 and outputs the filtered output to the ADC 110.

The added linear adaptive FIR filter 352 tracks the linear frequency response and latency of the observation loop. The adaptation loop operates with reduced sampling rate. Due to the adaptive FIR filter 352, the error signal e(n) includes only nonlinear distortion components of the feedback signal as the adaptive filter tracks and cancels all the linear distortion. Eliminating the desired portion of the signal from the adaptation module 114 input improves the convergence behavior of the adaptation module 114.

The output of the adaptive FIR filter 352 is also used as input to the distortion model 302. This allows the distortion model 302 to generate the distortion signal components, which are properly aligned with the distortion measured in the observation loop.

In FIG. 6, the transmitter 350 includes the reconstruction low pass filter 354 at the output of the DAC 104 and the band pass filter 356 at the input of the ADC 110. The band pass filter 356 at the input of the ADC 110 selects the desired DPD band and eliminates any undesired signals that would interfere with the operation of the adaptation loop. The adaptive FIR filter 352 compensates for the in-band frequency response of both the filters 354 and 356. Accordingly, both the filters 354 and 356 do not affect the DPD loop operation.

Referring now to FIGS. 7-13, simulation results obtained for the DPD architecture described above using Matlab/Simulink simulations are shown. For the purpose of simulation, the PA distortion was modeled by adding cubed signal and cubed signal derivative components to the PA output. The distortion was generated and added in continuous time domain. The pre-distortion was applied in discrete time domain using a circuit shown in FIG. 7, which follows the general distortion model from Equation (1).

The DAC update rate in the simulation was set to 4.05504 GHz. The sampling rate in the observation loop was selected to be 61 times lower than the DAC update rate, which is 66.476 MHz. The 61 ratio was selected to avoid synchronization of the slow sampling with the symbols in the modulated signal. The step coefficient $\mu$ in the LMS algorithm has been selected for best tradeoff between the convergence time and variation of the pre-distortion parameters in the steady state. If smaller variation of the parameter values in steady state is desired, $\mu$ can be decreased. Decreasing $\mu$ will stabilize the parameters in the steady state at the cost of increasing convergence time.

Two simulation cases were run with four-carrier WCDMA signal with two different PA distortion levels. The simulation was also run with six-carrier GSM (GMSK) signal. All the simulations have been run with 14-bit input patterns and quantization noise corresponding to 14-bit resolution added to the input of the ADC. The simulation results are shown in FIGS. 8-13. The graphs show signal spectral plots without and with DPD. The graphs also show convergence of the DPD weights over time.

Figure 8A:
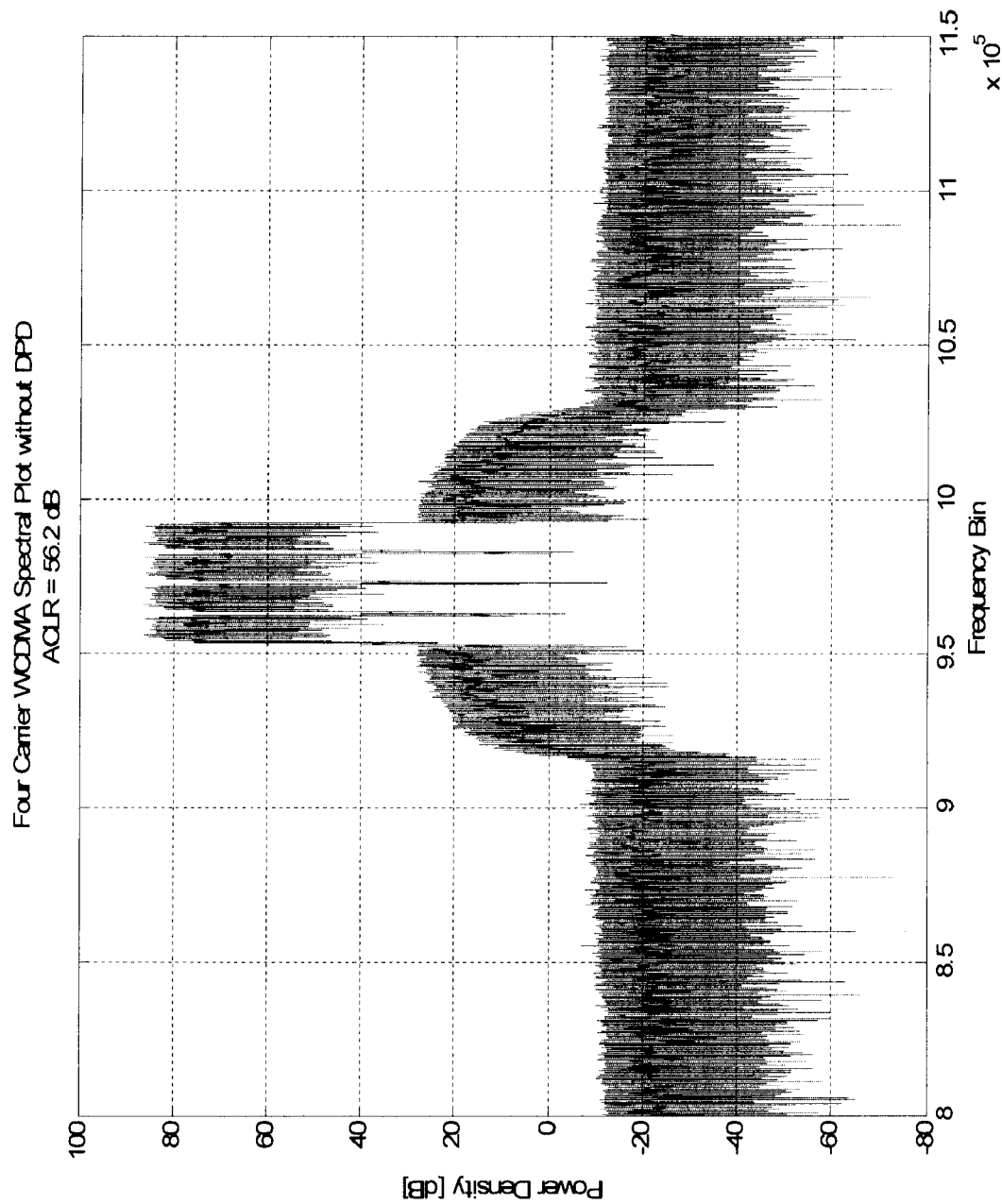
FIGS. 8A and 8B respectively show spectral plots without and with DPD for a first WCDMA simulation.
Figure 8B:
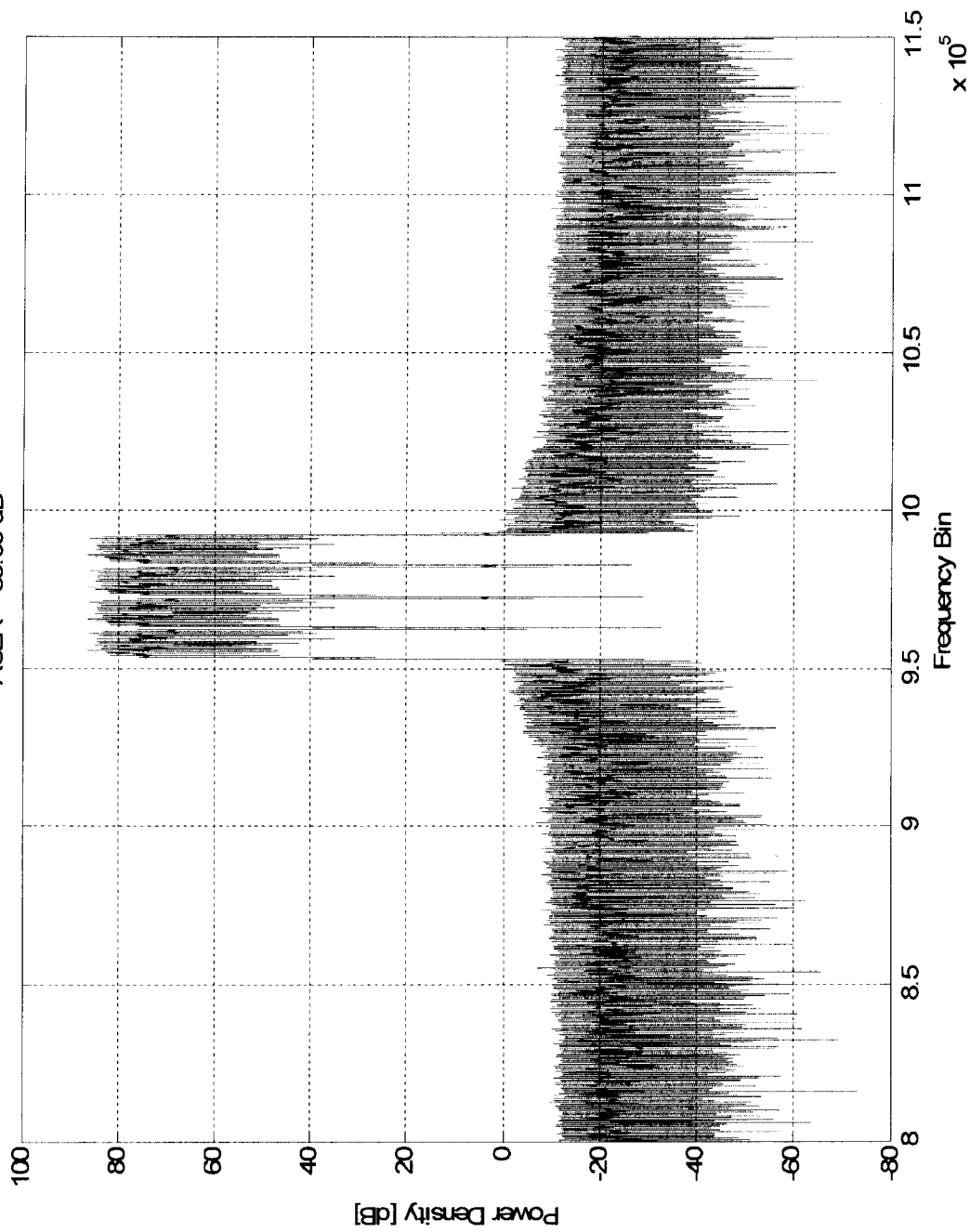
Figure 9:
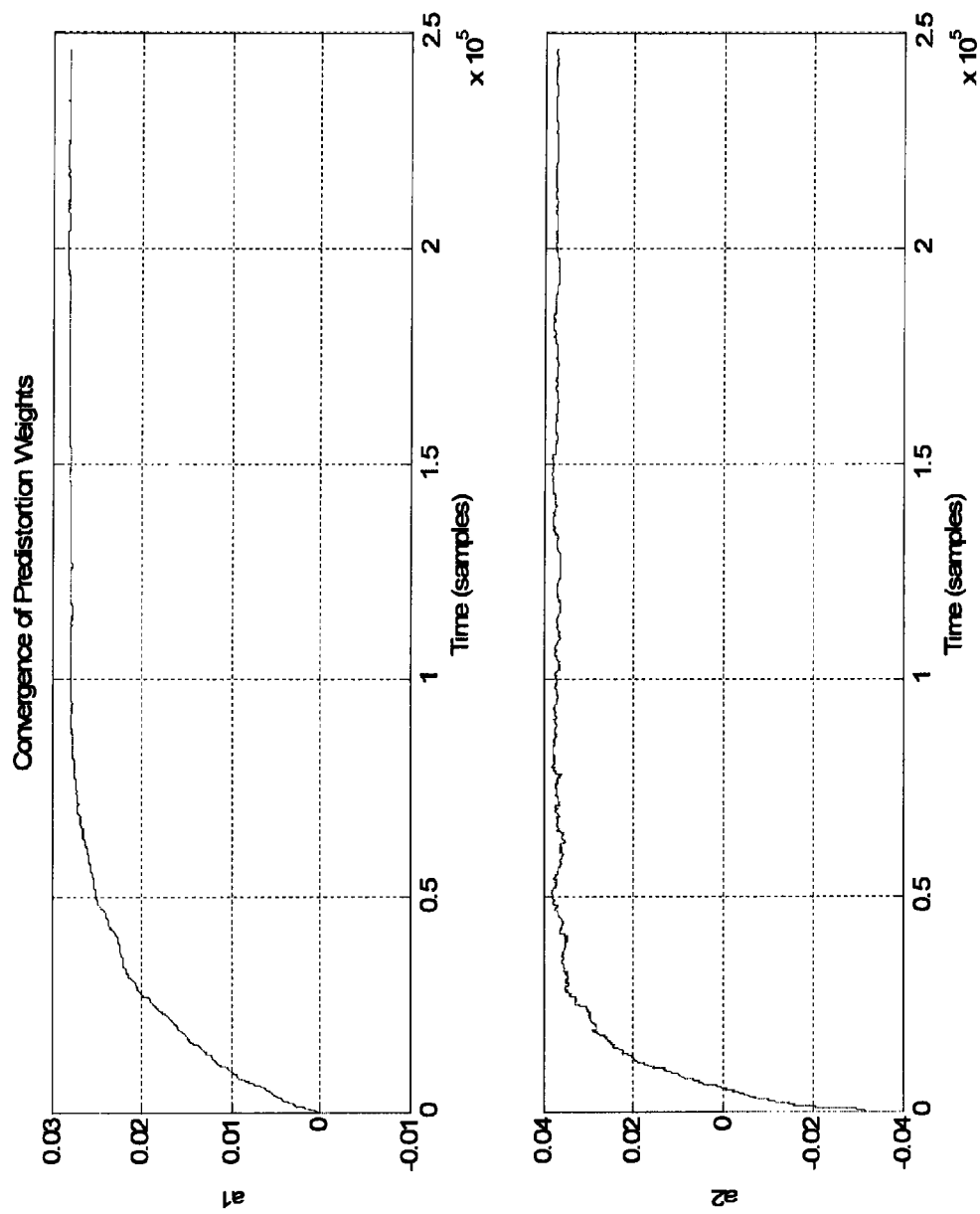
FIG. 9 is a graph showing convergence of pre-distortion parameters over time for the first WCDMA simulation.
Figure 10A:
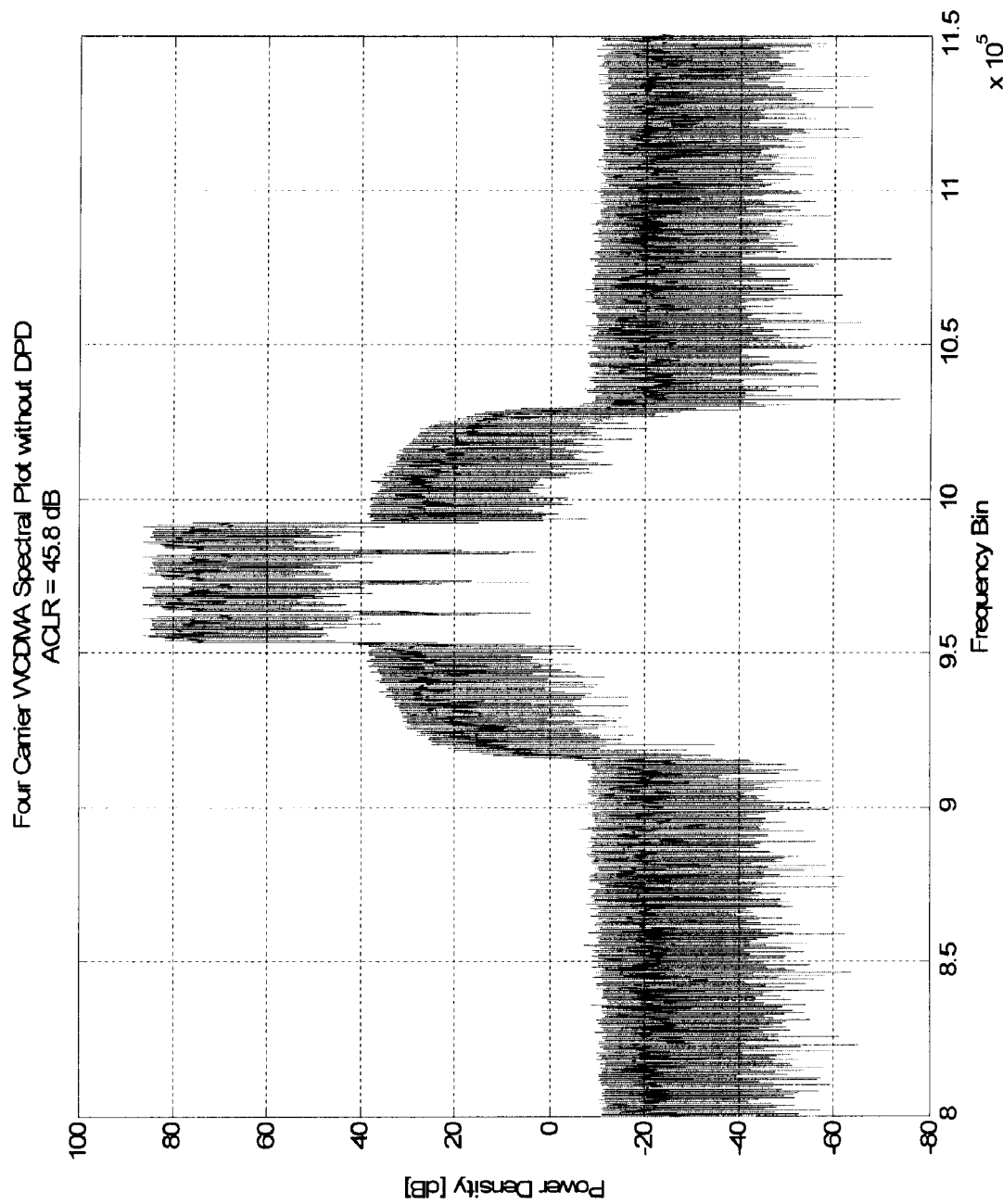
FIGS. 10A and 10B respectively show spectral plots without and with DPD for a second WCDMA simulation.
Figure 10B:
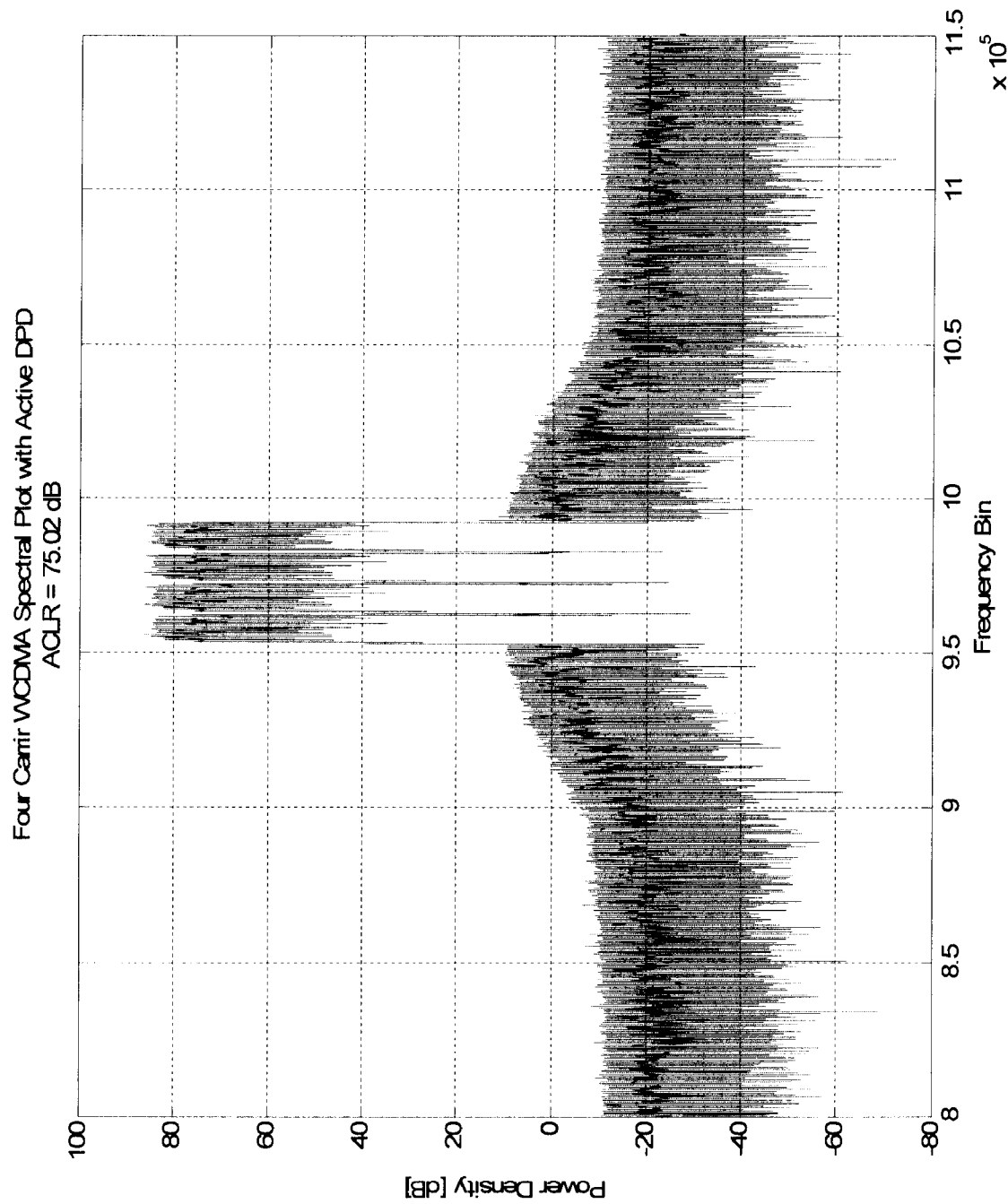
Figure 11:
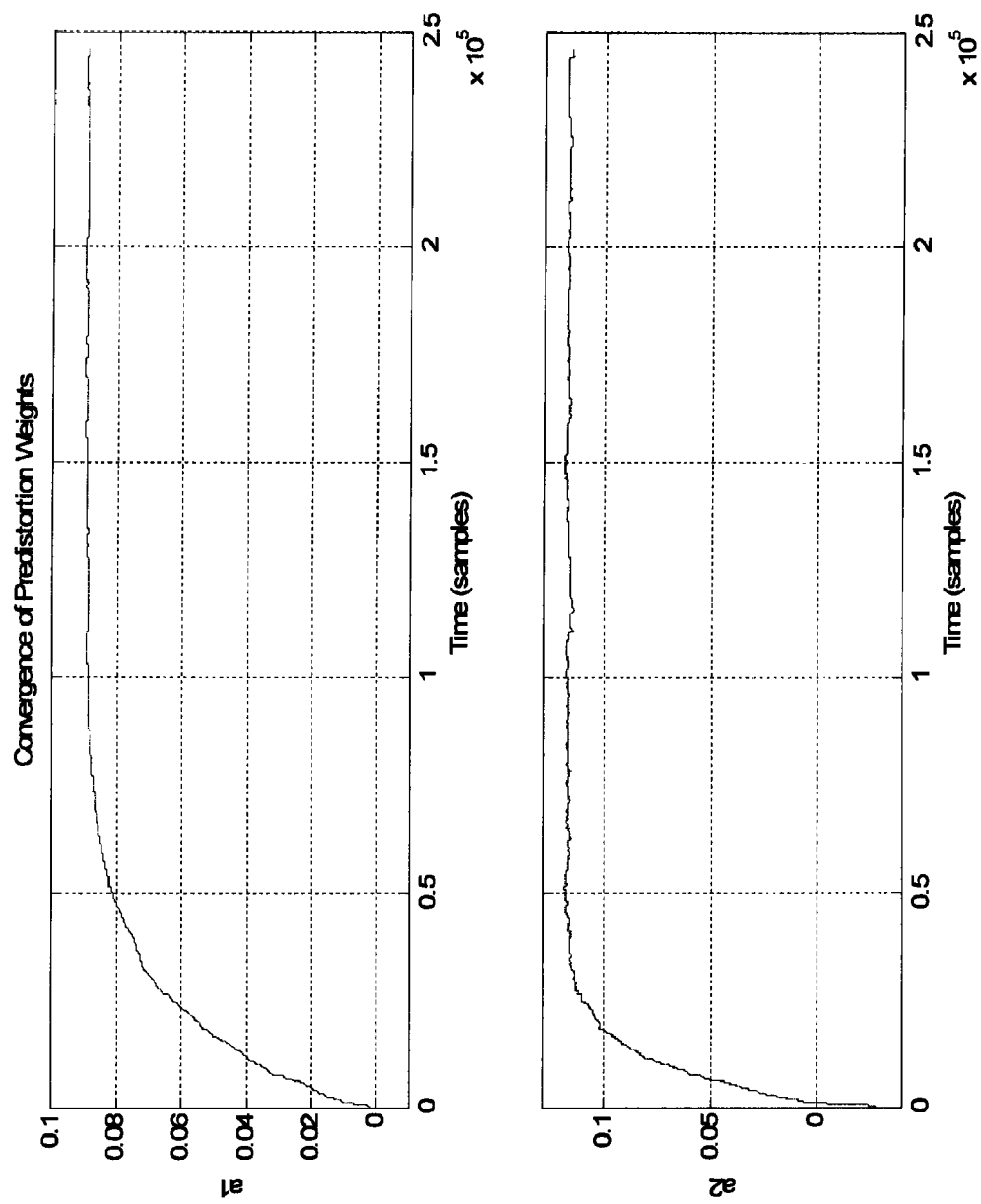
FIG. 11 is a graph showing convergence of pre-distortion parameters over time for the second WCDMA simulation.
Figure 12A:
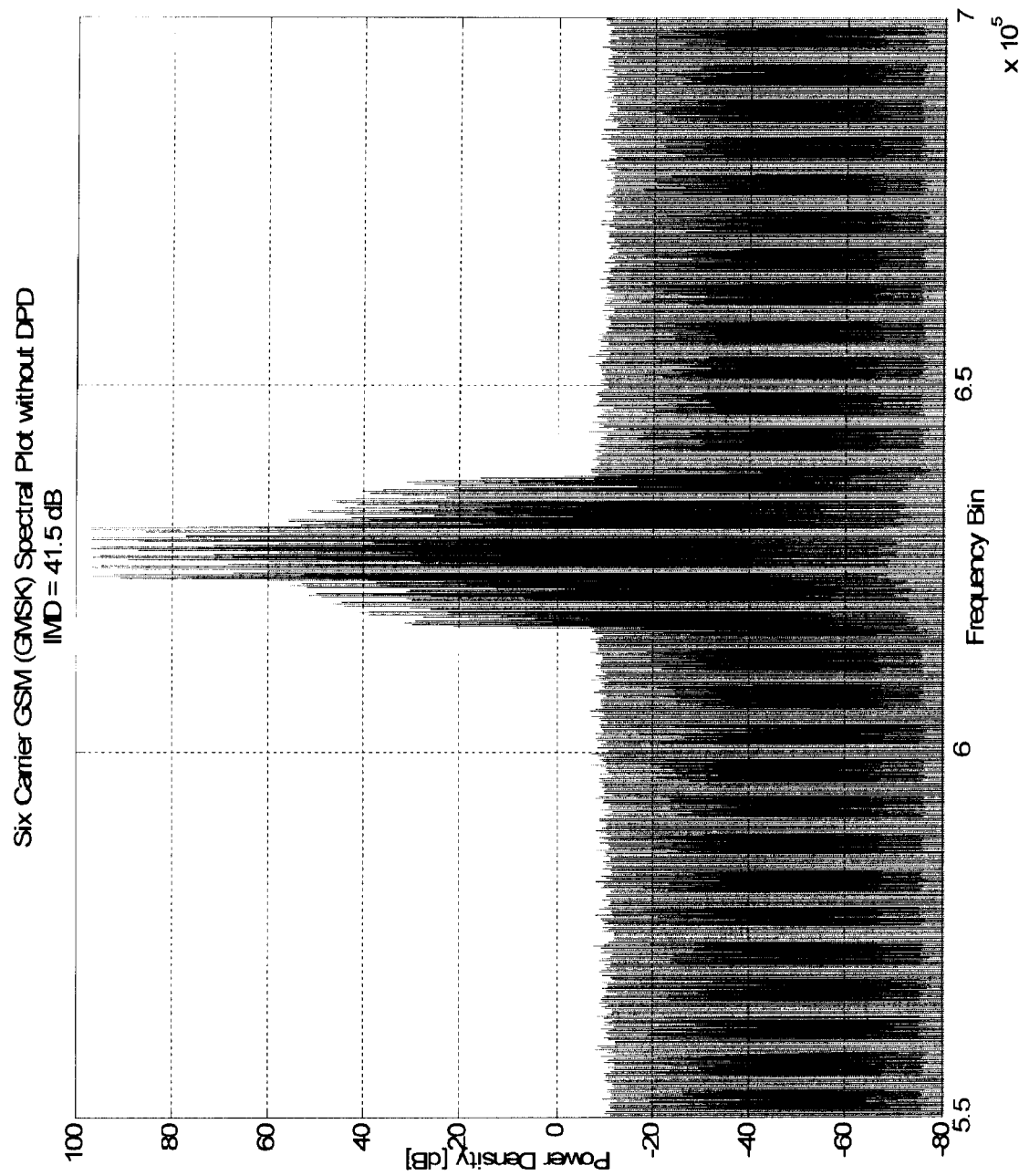
FIGS. 12A and 12B respectively show spectral plots without and with DPD for GSM simulation.
Figure 12B:
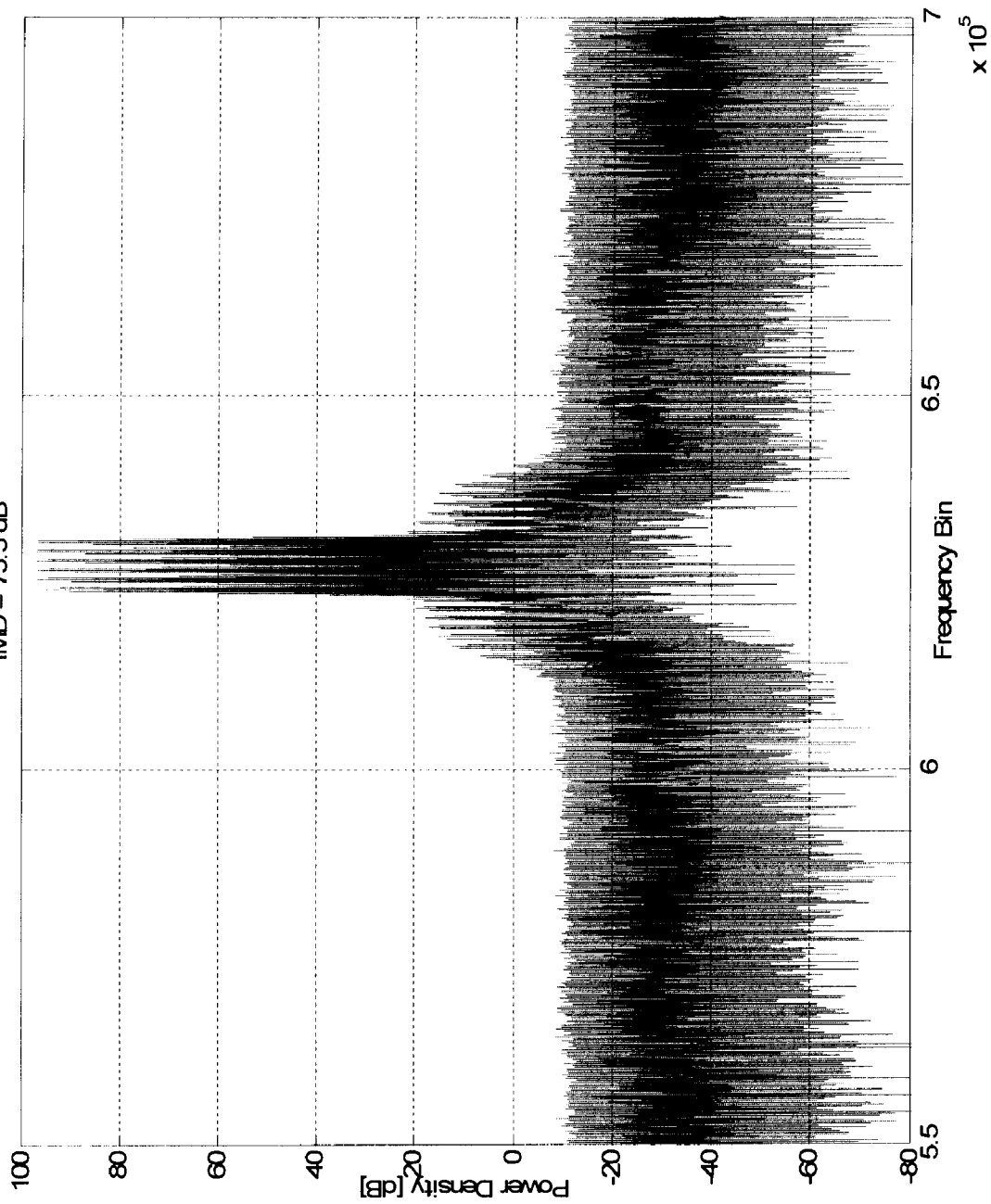
Figure 13:
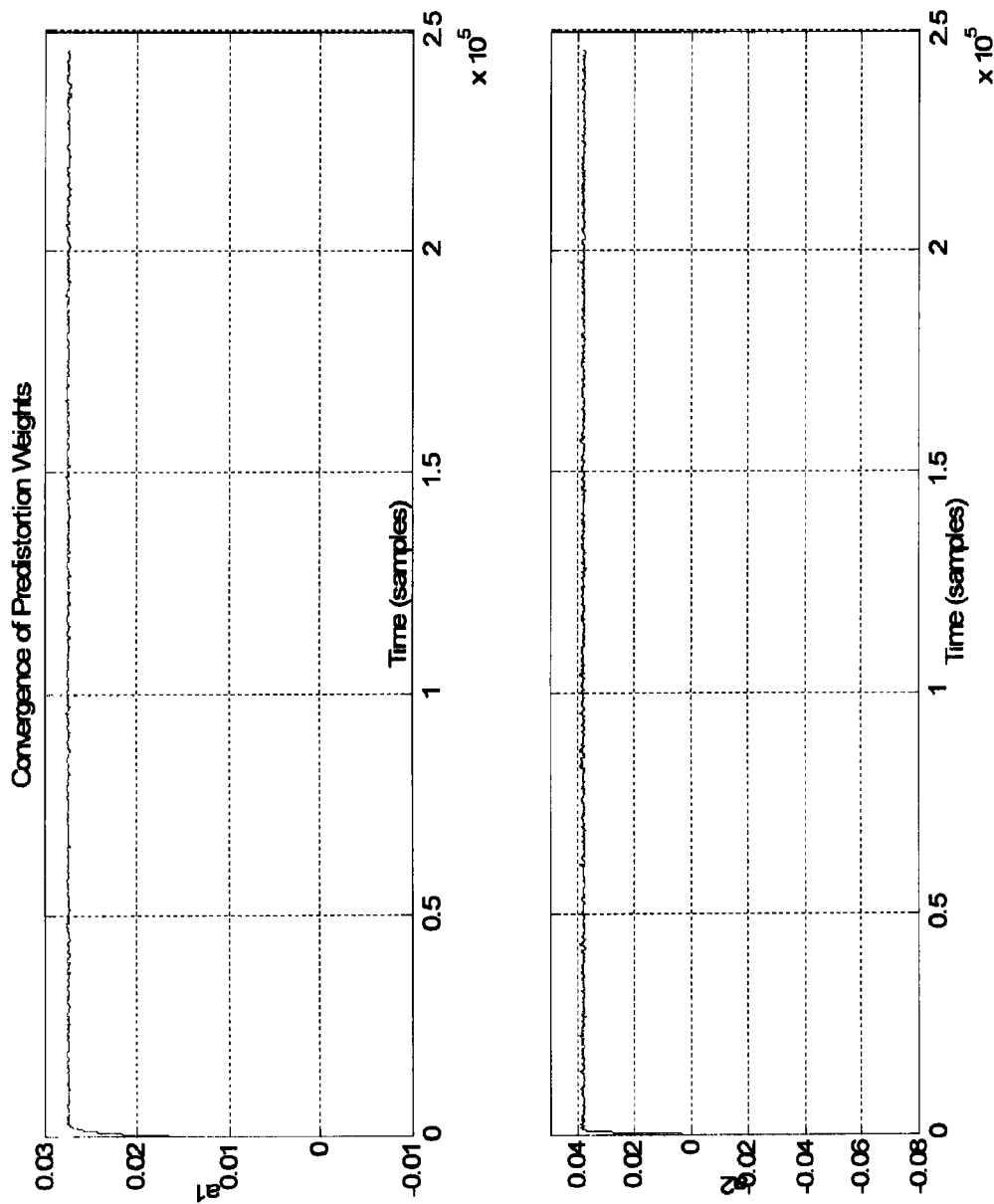
FIG. 13 is a graph showing convergence of pre-distortion parameters over time for GSM simulation.

FIGS. 8A and 8B respectively show spectral plots without and with DPD for a first WCDMA simulation. The graphs in FIG. 9 show convergence of pre-distortion parameters over time for the first WCDMA simulation. FIGS. 10A and 10B respectively show spectral plots without and with DPD for a second WCDMA simulation. The graphs in FIG. 11 show convergence of pre-distortion parameters over time for the second WCDMA simulation. FIGS. 12A and 12B respectively show spectral plots without and with DPD for GSM simulation. The graphs in FIG. 13 show convergence of pre-distortion parameters over time for GSM simulation.

The simulation results indicate that the DPD architecture according to the present disclosure was consistently resulting in around 30 dB improvement in the distortion level. The simulation results also appear to indicate that the distortion cancellation was limited by the pre-distortion model rather than by the convergence of the adaptive algorithm.

In summary, the present disclosure relates to the following: Implementing DPD architecture allowing for arbitrary low sampling rate in the observation loop; randomizing sampling instances in the observation loop to improve performance of the adaptation algorithm; adding adaptive linear filter in the forward signal path to compensate for linear distortion in the observation loop; using the output of the adaptive filter to generate distortion components time-aligned with distortion measured in the observation loop; using the output of the adaptive filter to cancel the undistorted portion of the signal measured in the observation loop and to deliver only distortion components to the adaptation block; and implementing the low sampling rate DPD in baseband frequency domain to reduce required data rate in the DSP modules.

Figure 14A:
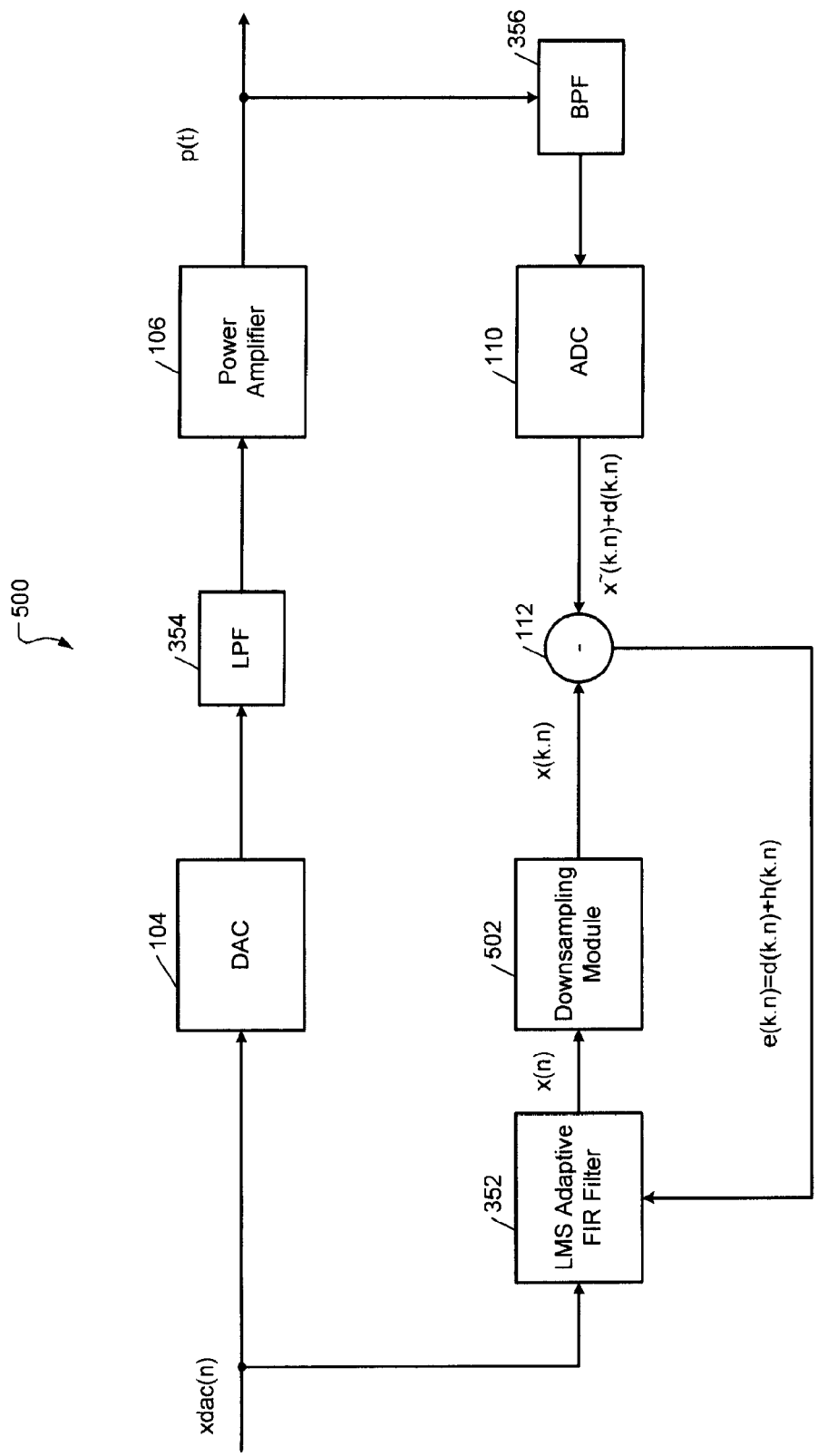
FIGS. 14A and 14B depict a transmitter including a digital pre-distortion (DPD) system operating in baseband frequency domain.
Figure 14B:
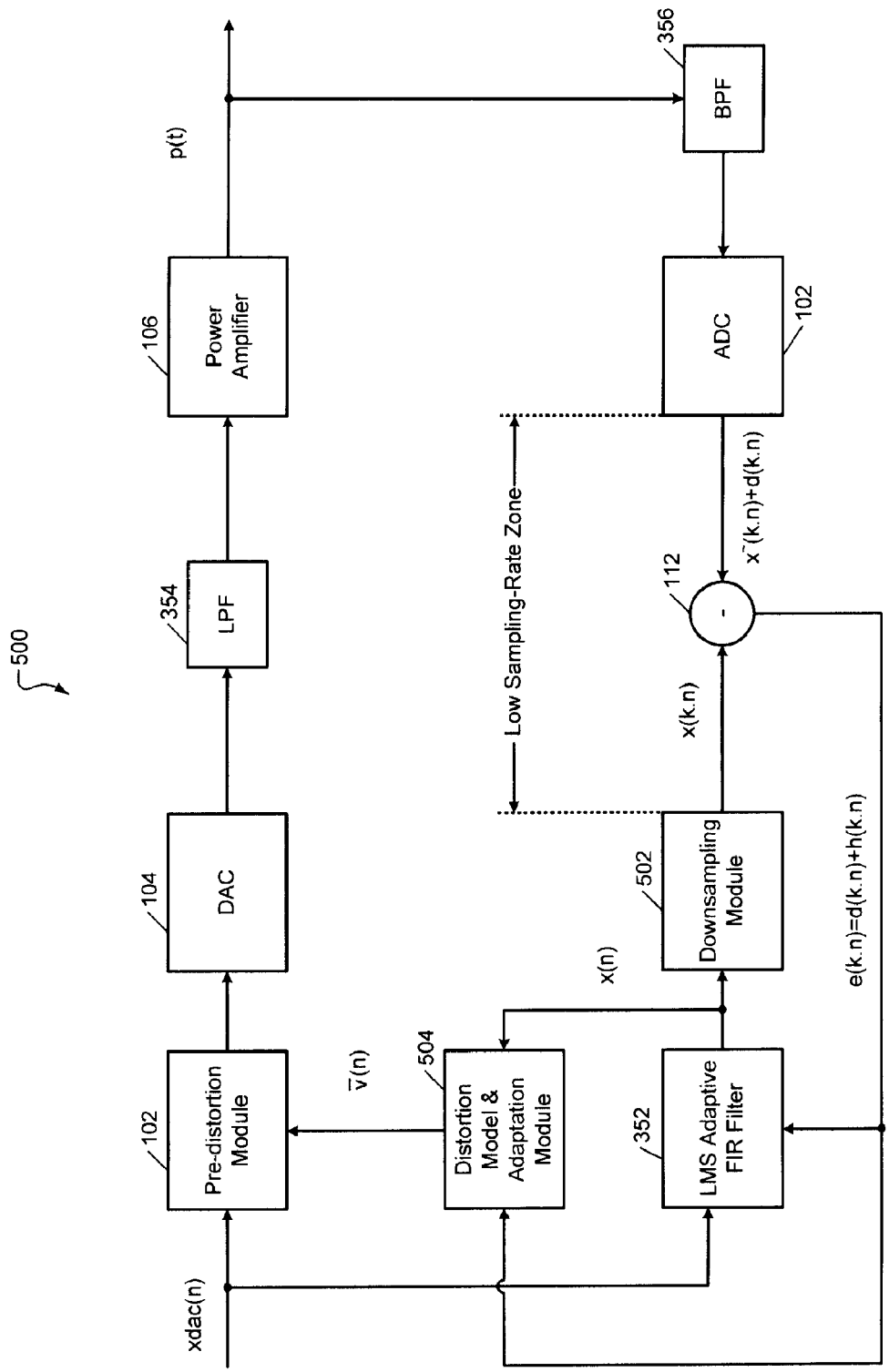

Referring now to FIGS. 14A and 14B, an implementation of the DPD architecture in a transmitter 500 according to the present disclosure is shown. In FIG. 14A, the transmitter 500 includes the DAC 104, the low-pass filter 354, the power amplifier 106, the band-pass filter 356, the ADC 110, the subtractor 112, the adaptive FIR filter 352, and a downsampling module 502. The downsampling module 502 downsamples the output of the adaptive FIR filter 352 by k and outputs downsampled data x(k·n) to the subtractor 112. The subtractor 112 generates the error signal e(k·n) based a difference between the output of the ADC 110 operating at reduced sampling rate and the output of the downsampling module 502.

The linear adaptive FIR filter 352 tracks and cancels the undistorted portion of the signal in the observation loop. The adaptive FIR filter 352 uses the error signal e(k·n) sampled at the reduced rate and minimizes the power of the error signal e(k·n). The error signal e(k·n) includes all nonlinear distortion components d(k·n) and a small residual linear component h(k·n).

In FIG. 14B, the transmitter 500 further includes the pre-distortion module 102 and an adaptation module 504 that also includes a distortion model of the power amplifier 106. The adaptation module 504 controls the pre-distortion module 102 based on the error signal e(k·n) and the output of the adaptive FIR filter 352.

The adaptation algorithm uses the distortion model to adjust the parameters of the pre-distortion module 102 and to minimize the power of the error signal e(k·n). The adaptation module 504 uses the error signal e(k·n) sampled at the reduced rate. Once the power of the error signal e(k·n) reaches a minimum value, the parameters of the pre-distortion module 102 are optimized.

Figure 15:
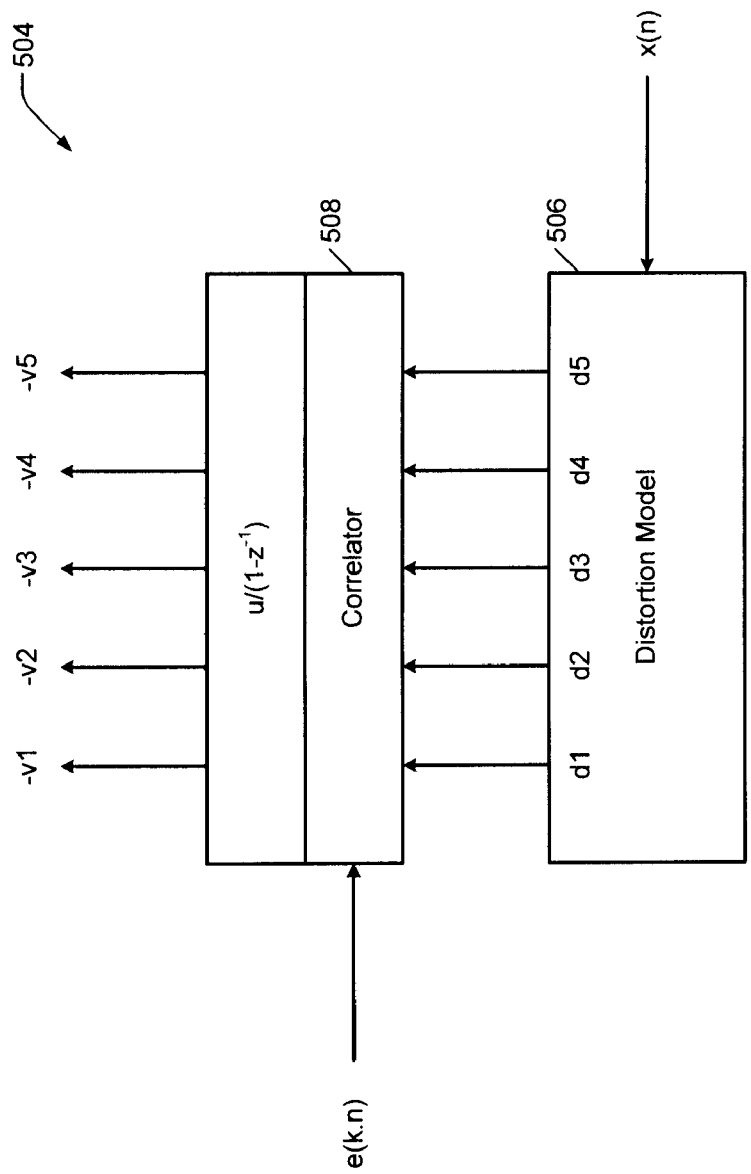
FIG. 15 is a functional block diagram of an adaptation module used in the transmitter of FIG. 14B.

Referring now to FIG. 15, the adaptation module 504 includes a distortion model 506 and a correlator 508. The distortion model 506 generates the signal components used in the Volterra series expansion. The correlator 508 computes the correlation between the error signal e(k·n) and all distortion signal components and adjusts values vn of vector v. The pre-distortion module 102 includes a copy of the distortion model 506 and uses the vector v as weights for the distortion signal components.

The adaptation equation in this algorithm is of the form:

$$\bar{v}_{n+1} = \bar{v}_{n} + \mu \cdot e(n)\bar{d}(n)$$

The reduced sampling rate of the error signal e(k·n) is equivalent to changing $\mu$, an adaptation coefficient, from 0 to 1 at every $k^{th}$ sample. μ is non-zero at every $k^{th}$ sample, and zero at other times. Accordingly, Vn+1=Vn when μ=0 at times except at every $k^{th}$ sample, and there is no update; and Vn+1≠Vn when μ=1 at every $k^{th}$ sample, and there is an update at every $k^{th}$ sample.

Essentially, as shown in FIG. 14B, the distortion signal is sampled in the observation loop at a lower sampling rate than a Nyquist sampling rate, and samples of the distortion signal are correlated with samples generated by the distortion model. The correlation generates weights for signals generated by the distortion model. To simplify this operation, the linear adaptive FIR filter 352 is used to align the signal in the observation loop with the signal used to generate distortion signal components in the distortion model. The adaptive FIR filter 352 also uses the reduced sampling rate in its feedback loop. Thus, two levels of adaptation are used.

The adaptive FIR filter 352 generates a frequency response that is similar to the frequency response of the portion of the transmitter including the DAC 104, the LPF 354, and the power amplifier 106. The difference between the output of the adaptive FIR filter 352 and the output of the ADC 110 includes only non-linear components. Thus, the error signal e(k·n) includes only non-linear components. The adaptation module 504, using the distortion model 506 and the correlator 508, generates the vectors to compensate for the non-linear components.

Accordingly, since the power amplifier 106 distorts the data to be transmitted due to nonlinearities, the DPD system provides information that can be used to deliberately distort the digital data. When the distorted digital data is converted to analog format and amplified by the power amplifier 106, the output of the power amplifier 106, after the distortion produced by the power amplifier 106, will accurately represent the undistorted digital data. To accomplish this, the output of the power amplifier 106 is observed, sampled, and compared with the undistorted digital data, and the pre-distortion of the digital data is manipulated.

The adaptive FIR filter 352 has programmable coefficients. The coefficients are adjusted such that the output of the adaptive FIR filter 352, x(n), is aligned in time with the signal in the observation loop. The coefficients are adjusted every k samples downsampled by the downsampling module 502. The sampling rate of the downsampling module (i.e., the downsampling factor k) aligns in time with the samples coming out of the ADC 110.

The distortion model 506 distorts the output of the adaptive FIR filter 352, x(n), based on the nonlinearities of the power amplifier 106 and generates nonlinear components. The correlator 508 correlates the nonlinear components generated by the distortion model 506 with the nonlinear components of the error signal e(k·n) and generates weights. The weights are used by the pre-distortion module 102 to deliberately distort the digital data to compensate for the distortion that will be subsequently introduced by the power amplifier 106.

Figure 16:
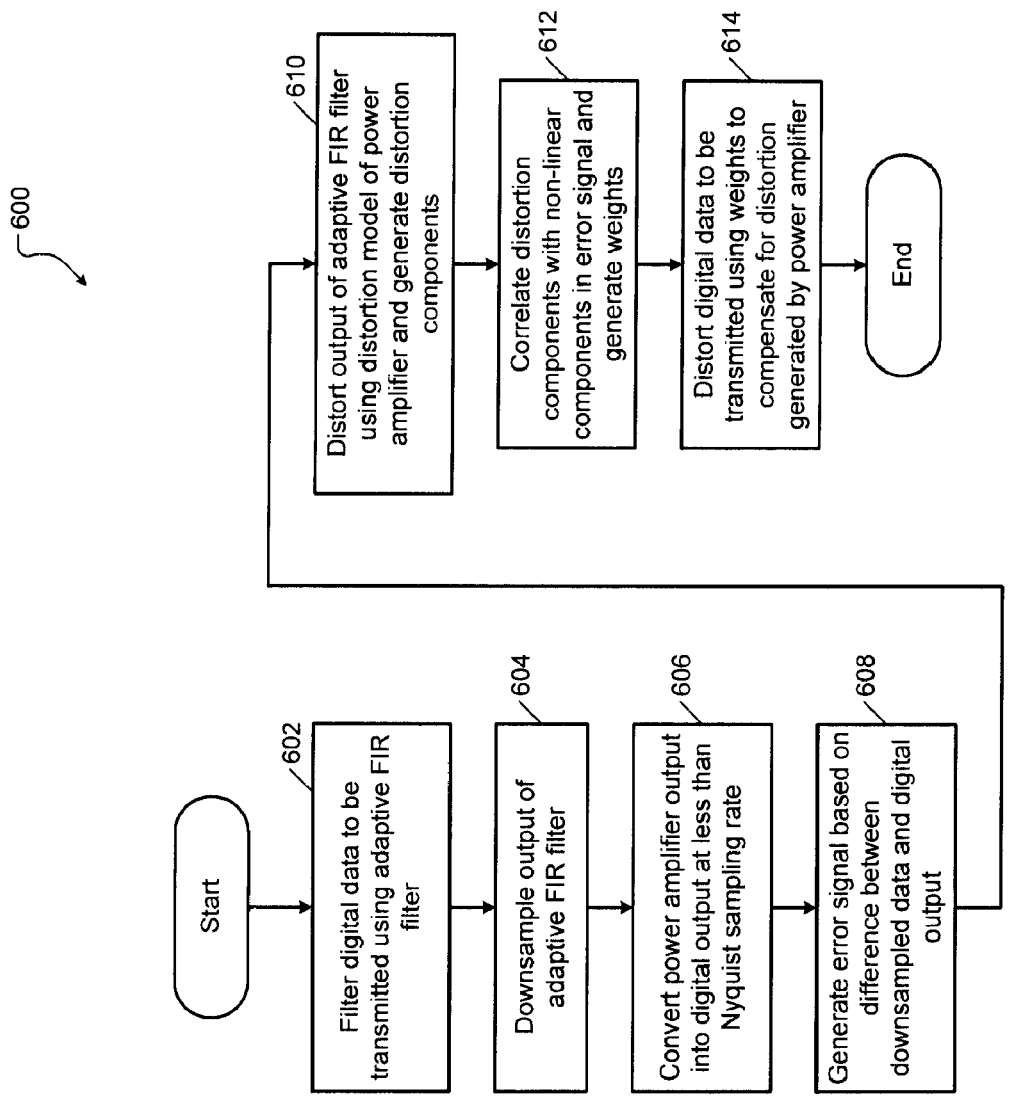
FIG. 16 is a flowchart of a method for sampling power amplifier output at less than Nyquist rate, pre-distorting data to be transmitted, and compensating for power amplifier distortion.

Referring now to FIG. 16, a method 600 for sampling power amplifier output at less than Nyquist rate, pre-distorting data to be transmitted, and compensating for power amplifier distortion is shown. At 602, control filters digital data to be transmitted using an adaptive FIR filter. At 604, control downsamples the output of the adaptive FIR filter. At 606, control converts the output of the power amplifier into digital output at a sampling rate less than the Nyquist sampling rate. At 608, control generates an error signal based on a difference between the downsampled data and the digital output. At 610, control distorts the output of the adaptive FIR filter using a distortion model of the power amplifier and generates distortion components. At 612, control correlates the distortion components with nonlinear components in the error signal and generates weights. At 614, control distorts the digital data to be transmitted using the weights to compensate for the distortion generated by the power amplifier.

In some cases, the transmit signal may have cyclostationary characteristics, and the reduced sampling rate has to be selected such that the sampling is not synchronized with the transmit signal cycle. The statistical characteristic of the sampled transmit signal may be further improved by randomizing the sampling instances in the reduced sampling rate path.

Based on the foregoing, the present disclosure can be summarized as follows. The DPD architecture disclosed herein uses a statistical estimate of the power of the error signal for pre-distortion optimization and allows for arbitrary low sampling rate in the observation loop. The DPD architecture uses a linear adaptive filter, with a reduced sampling rate in the adaptation loop, in the feed-forward path of the observation loop to cancel the linear components of the feedback signal and to phase-align the DAC input signal with the observation loop feedback signal. The DPD architecture uses the linear adaptive filter error signal, containing mostly nonlinear distortion components, as an error signal for the pre-distortion adaptation module and reduces the adaptation convergence time. The DPD architecture uses the phase-aligned signal as the input to the distortion model and reduces the number of terms in the distortion model. The DPD architecture uses reduced sampling rate in the feedback path of the pre-distortion adaptation loop. The DPD architecture randomizes sampling instances in the observation loop to improve performance of the adaptation algorithm.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a digital to analog converter that generates analog data based on digital data;
   a power amplifier that generates output data based on the analog data;
   an analog-to-digital converter that generates samples based on the output data at a sampling rate less than a Nyquist sampling rate;
   a filter that filters the digital data and that generates filtered data;
   a downsampling module that downsamples the filtered data and that generates downsampled data that are time-aligned with the samples generated by the analog-to-digital converter;
   a subtractor that generates an error signal based on the samples and the downsampled data;
   a distortion model of the power amplifier that is used to distort the filtered data to generate distortion components;
   a correlator that correlates the distortion components with nonlinear components of the error signal and that generates weights; and
   a pre-distortion module that distorts the digital data based on the weights to compensate for distortion generated by the power amplifier.

2. A system comprising:
   a digital to analog converter that generates analog data based on digital data;
   a power amplifier that generates output data based on the analog data;
   an analog-to-digital converter that generates samples based on the output data at a sampling rate less than a Nyquist sampling rate;
   a filter that includes a finite impulse response filter having coefficients that are adjusted based on an error signal at every k-th sample generated by the analog-to-digital converter, that filters the digital data, and that generates filtered data;
   a downsampling module that downsamples the filtered data by a factor k and that generates downsampled data that are time-aligned with the samples generated by the analog-to-digital converter; and
   a subtractor that generates the error signal based on the samples and the downsampled data; and
   pre-distortion module that distorts the digital data based on the samples and the filtered data to compensate for distortion generated by the power amplifier.

3. The system of claim 2 further comprising:
   an adaptation module that includes a distortion model of the power amplifier that is used to generate weights based on the samples and the filtered data,
   wherein the pre-distortion module distorts the digital data based on the weights.

4. The system of claim 2 further comprising an adaptation module that includes:
   a distortion model of the power amplifier that is used to distort the filtered data to generate distortion components; and
   a correlator that correlates the distortion components with nonlinear components of the error signal generated based on the samples and the filtered data and that generates weights,
   wherein the pre-distortion module distorts the digital data based on the weights.

5. A system comprising:
   a power amplifier that generates output data based on digital data;
   an analog-to-digital converter that generates samples based on the output data at a sampling rate less than a Nyquist sampling rate;
   a filter that filters the digital data and that generates filtered data;
   a downsampling module that downsamples the filtered data and that generates downsampled data that are time-aligned with the samples generated by the analog-to-digital converter;
   a subtractor that generates an error signal based on the samples and the downsampled data;
   a distortion model of the power amplifier that is used to distort the filtered data to generate distortion components;
   a correlator that correlates the distortion components with nonlinear components of the error signal generated based on the samples and the filtered data and that generates weights; and
   a pre-distortion module that distorts the digital data based on the weights to compensate for distortion generated by the power amplifier.

6. A system comprising:
   a power amplifier that generates output data based on digital data;
   an analog-to-digital converter that generates samples based on the output data at a sampling rate less than a Nyquist sampling rate;
   a filter that includes a finite impulse response filter having coefficients that are adjusted based on an error signal at every k-th sample generated by the analog-to-digital converter, that filters the digital data, and that generates filtered data;
   a downsampling module that downsamples the filtered data by a factor k and that generates downsampled data that are time-aligned with the samples generated by the analog-to-digital converter;
   a subtractor that generates the error signal based on the samples and the downsampled data;
   distortion model of the power amplifier that is used to distort the filtered data to generate distortion components;
   a correlator that correlates the distortion components with nonlinear components of the error signal generated based on the samples and the filtered data and that generates weights; and a pre-distortion module that distorts the digital data based on the weights to compensate for distortion generated by the power amplifier.

7. A method comprising:

generating analog data based on digital data;

generating output data based on the analog data using a power amplifier;

generating samples based on the output data at a sampling rate less than a Nyquist sampling rate;

filtering the digital data to generate filtered data;

downsampling the filtered data and generating downsampled data that are time-aligned with the samples;

generating an error signal based on the samples and the downsampled data;

distorting the filtered data using a distortion model of the power amplifier to generate distortion components;

correlating the distortion components with nonlinear components of the error signal to generate weights; and distorting the digital data based on the weights to compensate for distortion generated by the power amplifier.

8. A method comprising:

generating analog data based on digital data;

generating output data based on the analog data using a power amplifier;

generating samples based on the output data at a sampling rate less than a Nyquist sampling rate;

filtering the digital data to generate filtered data;

adjusting coefficients for the filtering based on an error signal at every k-th sample;

downsampling the filtered data by a factor k and generating downsampled data that are time-aligned with the samples;

generating the error signal based on the samples and the downsampled data; and distorting the digital data based on the samples and the filtered data to compensate for distortion generated by the power amplifier.

9. The method of claim 8 further comprising:

generating weights based on the samples and the filtered data using a distortion model of the power amplifier; and distorting the digital data based on the weights.

10. The method of claim 8 further comprising:

distorting the filtered data using a distortion model of the power amplifier to generate distortion components;

correlating the distortion components with nonlinear components of the error signal generated based on the samples and the filtered data to generate weights; and distorting the digital data based on the weights.

11. A method comprising:

generating output data based on digital data using a power amplifier;

generating samples based on the output data at a sampling rate less than a Nyquist sampling rate;

filtering the digital data to generate filtered data;

downsampling the filtered data to generate downsampled data that are time-aligned with the samples;

generating an error signal based on the samples and the downsampled data;

distorting the filtered data using a distortion model of the power amplifier to generate distortion components;

correlating the distortion components with nonlinear components of the error signal generated based on the samples and the filtered data to generate weights; and distorting the digital data based on the weights to compensate for distortion generated by the power amplifier.

12. A method comprising:

generating output data based on digital data using a power amplifier;

generating samples based on the output data at a sampling rate less than a Nyquist sampling rate;

filtering the digital data to generate filtered data;

adjusting coefficients for the filtering based on an error signal at every k-th sample;

downsampling the filtered data by a factor k to generate downsampled data that are time-aligned with the samples;

generating the error signal based on the samples and the downsampled data; and distorting the filtered data using a distortion model of the power amplifier to generate distortion components;

correlating the distortion components with nonlinear components of the error signal generated based on the samples and the filtered data to generate weights; and distorting the digital data based on the weights to compensate for distortion generated by the power amplifier.

* * * * *

UNITED STATES PATENT AND TRADEMARK OFFICE
CERTIFICATE OF CORRECTION

PATENT NO.        : 9,014,299 B2
APPLICATION NO.   : 13/932099
DATED             : April 21, 2015
INVENTOR(S)       : Jerzy Antoni Teterwak It is certified that error appears in the above-identified patent and that said Letters Patent is hereby corrected as shown below:

In the Drawings:

Sheet 5 of 20, Reference Numeral 116, FIG. 5 — Delete "116" and insert --106--

In the Specification:

Column 4, Line 48 — Delete "x(n)." and insert --x~(n).--

Column 4, Line 48 — Delete "x(n)" and insert --x~(n)--

Column 6, Line 9 — Delete "y(n)." and insert --y~(n).--

Column 6, Line 9 — Delete "y(n)" and insert --y~(n)--

Column 7, Line 44 — Delete "V (n)" and insert -- $\overline{v}(n)$ --

Column 7, Line 59 — Delete "do" and insert --dn--

Column 7, Line 59 — Delete "16" and insert --15--

Column 7, Line 60 — Delete "v(n)" and insert -- $\overline{v}(n)$ --

Column 10, Lines 64-65 (approx.) — Delete " $\overline{v}_{n+1} = \overline{v}_{n+\mu} \cdot e(n)\overline{d}(n)$ ," and insert -- $\overline{v}_{n+1} = \overline{v}_n + \mu \cdot e(n)\overline{d}(n)$ --

Column 11, Line 2 — Delete "Vn+1=Vn" and insert --$V_{n+1}=V_n$--

Column 11, Line 4 — Delete "Vn+1≠Vn" and insert --$V_{n+1} \neq V_n$--

In the Claims:

Column 13, Line 62, Claim 2 — After "converter;", delete "and"

Signed and Sealed this
Thirteenth Day of October, 2015

Michelle K. Lee
*Director of the United States Patent and Trademark Office*

CERTIFICATE OF CORRECTION (continued)
U.S. Pat. No. 9,014,299 B2

| | |
|---|---|
| Column 13, Line 65, Claim 2 | Before "pre-distortion", insert --a-- |
| Column 14, Line 61, Claim 6 | Before "distortion", insert --a-- |